United States Patent
Yang et al.

(10) Patent No.: US 10,552,133 B2
(45) Date of Patent: Feb. 4, 2020

(54) IMAGE DEPLOYMENT METHOD AND APPARATUS

(71) Applicant: Huawei Technologies Co., Ltd., Shenzhen (CN)

(72) Inventors: Lei Yang, Xi'an (CN); Jincheng Li, Xi'an (CN); Hang Wang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 365 days.

(21) Appl. No.: 15/492,940

(22) Filed: Apr. 20, 2017

(65) Prior Publication Data
US 2017/0220329 A1   Aug. 3, 2017

Related U.S. Application Data

(63) Continuation of application No. PCT/CN2015/000291, filed on Dec. 31, 2015.

(51) Int. Cl.
*G06F 8/60*   (2018.01)

(52) U.S. Cl.
CPC ..................... *G06F 8/60* (2013.01)

(58) Field of Classification Search
CPC .............. G06F 8/60; G06F 8/63; H04L 67/34
See application file for complete search history.

(56) References Cited

U.S. PATENT DOCUMENTS

| | | | |
|---|---|---|---|
| 9,116,768 B1 * | 8/2015 | Sawhney | ................... G06F 8/60 |
| 2017/0031776 A1 * | 2/2017 | Ren | .................... G06F 11/1461 |
| 2017/0052771 A1 * | 2/2017 | Chen | ................... G06F 9/45558 |
| 2017/0083544 A1 * | 3/2017 | Alton | ......................... G06F 8/60 |
| 2017/0177860 A1 * | 6/2017 | Suarez | .................... G06F 21/31 |

FOREIGN PATENT DOCUMENTS

| | | |
|---|---|---|
| CN | 101594387 A | 12/2009 |
| CN | 102088367 A | 6/2011 |
| CN | 103037002 A | 4/2013 |

(Continued)

OTHER PUBLICATIONS

Diao, "Docker Mirror and Container Storage Structure Analysis," (Nov. 20, 2014).

(Continued)

*Primary Examiner* — S. Sough
*Assistant Examiner* — Stephen D Berman
(74) *Attorney, Agent, or Firm* — Leydig, Voit & Mayer, Ltd.

(57) ABSTRACT

This application discloses an image deployment method, where the image deployment method is applied to a container system. Information about an image that has been deployed on each host is collected. After an image tag of a to-be-deployed image is obtained, a degree of overlapping between the image that has been deployed on each host and the to-be-deployed image is determined. A host with a higher overlapping degree needs to download a smaller amount of data when deploying the to-be-deployed image and deploys the to-be-deployed image at a higher speed. Finally, a management node selects, according to overlapping degrees of the hosts, a deployment host for deploying the to-be-deployed image.

7 Claims, 15 Drawing Sheets

(56) References Cited

FOREIGN PATENT DOCUMENTS

| CN | 103514023 A | 1/2014 |
|----|-------------|--------|
| CN | 104809025 A | 7/2015 |

OTHER PUBLICATIONS

Shekhar et al., "A simulation as a service cloud middleware," Ann. Telecommun. (2016) 71:93-108, XP35957535, pp. 93-109, Institut Mines-Télécom and Springer-Verlag France, (Sep. 2, 2015).

"Containers and Images-Core Concepts/Architecture/OpenShift Enterprise 3.0," OpenShift Enterprise 3.0, XP055401783, pp. 1-2, https://docs.openshift.com/enterprise/3.0/architecture/core_concepts/containers_and_images.html, (Downloaded Sep. 25, 2017).

Gerlach et al.,"Skyport-Container-Based Execution Environment Management for Multi-Cloud Scientific Workflows," 2014 5th International Workshop on Data-Intensive Computing in the Clouds, IEEE Computer Society, XP058062140, pp. 25-32, Institute of Electrical and Electronics Engineers, New York, New York, (Nov. 2014).

\* cited by examiner

Mysql:5.4, layer identifier 1, layer identifier 2 of a parent image layer

Layer identifier 2, layer identifier 3 of a parent image layer

Layer identifier 3, layer identifier 4 of a parent image layer

Mysql:5.3, layer identifier 4, layer identifier 5 of a parent image layer     Mongo:2.2, layer identifier 7, layer identifier 8 of a parent image layer Layer identifier 5, layer identifier 6 of a parent image layer     Layer identifier 8, layer identifier 9 of a parent image layer

...

...

Ubuntu:12.10, layer identifier 10, layer identifier 11 of a parent image layer

...

...

Base image

FIG. 3

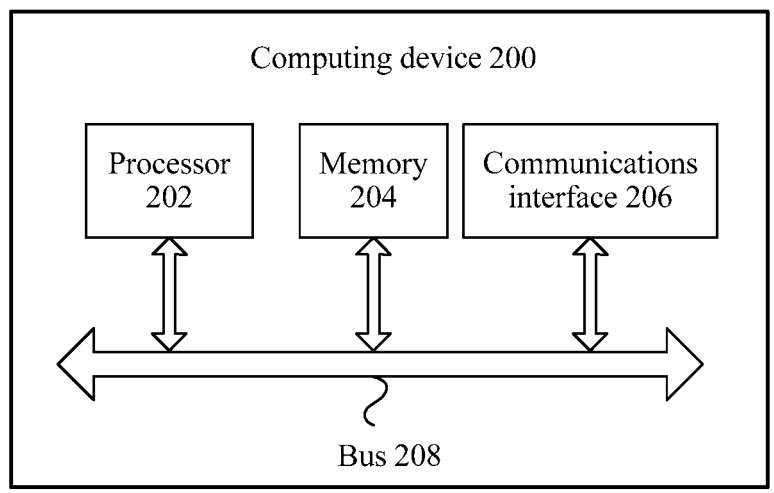

FIG. 4

IMAGE DEPLOYMENT METHOD AND APPARATUS

CROSS-REFERENCE TO RELATED APPLICATIONS

This application is a continuation of International Application No. PCT/CN2015/100291, filed on Dec. 31, 2015, the disclosure of which is hereby incorporated by reference in its entirety.

TECHNICAL FIELD

This application relates to the field of computer technologies, and in particular, to an image deployment method, an image deployment apparatus, a computing device for image deployment, and a container system that are applied to container technologies.

BACKGROUND

A container technology is an operating system-based lightweight virtualization technology. A container runs on user space in an operating system. Containers on one host can share an operating system kernel. In recent years, the container technology gradually becomes a research hotspot in cloud computing, and one of crucial container technologies is image layering. An image used in the container technology includes image layers. Each image layer includes various modifications made based on a parent image layer of the image layer. Therefore, a complete image needs to include all image layers required for the image. A user can create and release an image. Alternatively, the user can download a required image from an image registry, and after downloading the image onto a host, can start, according to the downloaded image, a container corresponding to the image.

Generally, multiple hosts for running containers run in a container system. When a user expects to deploy a container in the container system, the container system first needs to select a host from the multiple hosts to run the container. Then, the host detects whether an image layer stored on the selected host can support start of the container. If the image layer stored on the selected host cannot support start of the container, the host needs to request an image layer that is lacking from the image registry. Therefore, a time consumed for deploying a container includes a time for downloading an image required by the container and a time for starting the container after the image is downloaded. Because the time for starting the container is quite short after the image is downloaded, what limits a container deployment speed is usually the relatively long time for downloading the image.

SUMMARY

This application provides an image deployment method. A deployment host of a to-be-deployed image is selected by comparing a parent image of the to-be-deployed image and an image that has been deployed on each host, so as to improve an image deployment speed.

According to a first aspect of this application, an image deployment method is provided. A management node obtains an image tag of an image that has been deployed on each host. This step may be performed before the image deployment method, and does not need to be performed each time an image is being deployed, for example, may be performed periodically or performed when a trigger occasion is met. After obtaining an image tag of a to-be-deployed image, the management node obtains an image tag of a parent image of the to-be-deployed image, and compares the image tag of the parent image of the to-be-deployed image and the previously obtained image tag of the image that has been deployed on each host, so that it can be learned that which image in the image that has been deployed on each host belongs to the parent image of the to-be-deployed image, and it can also be learned that the host still lacks which image relative to the to-be-deployed image. According to comparison results of the hosts and a predetermined policy, a host that needs to download fewer images is selected to deploy the to-be-deployed image, so as to improve an image deployment speed.

With reference to the first aspect, in a first implementation manner of the first aspect, the trigger occasion for obtaining, by the management node, the image tag of the image that has been deployed on each host includes: a preset period expires, or a container deployment instruction is received, or a collection instruction sent by a user is received.

With reference to the first aspect or the first implementation manner of the first aspect, in a second implementation manner of the first aspect, the management node further obtains resource utilization information of each host. A host on which the management node has performed comparison may be a host that meets a resource utilization requirement of the to-be-deployed image and that is determined by the management node according to the resource utilization information of each host, that is, a to-be-selected host. The to-be-selected host is determined, so that workload of subsequent comparison performed by the management node is reduced, and working efficiency of the management node is improved.

With reference to the first aspect or either of the implementation manners of the first aspect, in a third implementation manner of the first aspect, the deployment node selected by the management node may be a host on which a largest quantity of parent images of the to-be-deployed image have been deployed. The host on which a largest quantity of parent images of the to-be-deployed image have been deployed needs to download fewest images, thereby further improving a deployment speed of the to-be-deployed image.

With reference to the first aspect or any one of the implementation manners of the first aspect, in a fourth implementation manner of the first aspect, because there is a correspondence between an image applied to the container field and a parent image of the image, generally, if an image is deployed on a host, all parent images of the image are deployed on the host. Therefore, when determining a parent image of the to-be-deployed image that has been deployed on each host, the management node compares, from top to bottom by starting from the image tag of the to-be-deployed image, the image tag of the parent image of the to-be-deployed image and an image tag of an image that has been deployed on each host, instead of comparing, one by one, the image tag of the parent image of the to-be-deployed image and the image tag of the image that has been deployed on each host. This reduces a comparison time for the management node and improves working efficiency of the management node.

A second aspect of this application provides an image deployment method. A management node obtains a layer identifier of an image layer that has been deployed on each host. This step may be performed before the image deployment method, and does not need to be performed each time an image is being deployed, for example, may be performed periodically or performed when a trigger occasion is met. After obtaining an image tag of a to-be-deployed image, the management node obtains a layer identifier of an image layer of the to-be-deployed image, and compares the layer identifier of the image layer of the to-be-deployed image and the previously obtained layer identifier of the image layer that has been deployed on each host, so that it can be learned that which image layer in the image layer that has been deployed on each host belongs to the to-be-deployed image, and it can also be learned that the host still lacks which image layer relative to the to-be-deployed image. A host that requires a smaller download amount is selected by using a comparison result of the hosts and a predetermined policy, to deploy the to-be-deployed image, so as to improve an image deployment speed.

With reference to the second aspect, in a first implementation manner of the second aspect, the trigger occasion for obtaining, by the management node, the layer identifier of the image layer that has been deployed on each host includes: a preset period expires, or a container deployment instruction is received, or a collection instruction sent by a user is received.

With reference to the second aspect or the first implementation manner of the second aspect, in a second implementation manner of the second aspect, the management node further obtains resource utilization information of each host. A host on which the management node has performed comparison may be a host that meets a resource utilization requirement of the to-be-deployed image and that is determined by the management node according to the resource utilization information of each host, that is, a to-be-selected host. The to-be-selected host is determined, so that workload of subsequent comparison performed by the management node is reduced, and working efficiency of the management node is improved.

With reference to any one of the second aspect or the implementation manners of the second aspect, in a third implementation manner of the second aspect, the deployment node selected by the management node may be a host on which a largest quantity of image layers of the to-be-deployed image have been deployed. The host on which a largest quantity of image layers of the to-be-deployed image have been deployed requires a smallest download amount, thereby further improving a deployment speed of the to-be-deployed image.

With reference to any one of the second aspect or the implementation manners of the second aspect, in a fourth implementation manner of the second aspect, because there is a correspondence between an image layer applied to a container field and a parent image layer of the image layer, generally, if an image layer is deployed on a host, a parent image layer of the image layer, a parent image layer of the parent image layer of the image layer, and the like are deployed on the host. Therefore, when determining an image layer that is of the to-be-deployed image and that has been deployed on each host, the management node performs comparison downward by starting from a layer identifier of a top-layer image layer of the to-be-deployed image, instead of comparing, one by one, the layer identifier of the image layer of the to-be-deployed image and the layer identifier of the image that has been deployed on each host. This reduces a comparison time for the management node and improves working efficiency of the management node.

A third aspect of this application provides an image deployment apparatus. The image deployment apparatus is configured to deploy an image in a container system. The image deployment apparatus includes at least one unit for executing the image deployment method provided in the first aspect.

A fourth aspect of this application provides an image deployment apparatus. The image deployment apparatus is configured to deploy an image in a container system. The image deployment apparatus includes at least one unit for executing the image deployment method provided in the second aspect.

A fifth aspect of this application provides a computing device. The computing device is configured to deploy an image in a container system. The computing device may be a management node in the container system. When running, the computing device executes the image deployment method provided in the first aspect.

A sixth aspect of this application provides a computing device. The computing device is configured to deploy an image in a container system. The computing device may be a management node in the container system. When running, the computing device executes the image deployment method provided in the second aspect.

A seventh aspect of this application provides an image deployment method. The image deployment method is applied to a host and a management node in a container system. When a trigger occasion is met, the host sends an image tag of a locally deployed image to the management node. For an execution part of the management node, refer to the image deployment method provided in the first aspect.

An eighth aspect of this application provides an image deployment method. The image deployment method is applied to a host and a management node in a container system. When a trigger occasion is met, the host sends a layer identifier of a locally deployed image layer to the management node. For an execution part of the management node, refer to the image deployment method provided in the second aspect.

A ninth aspect of this application provides a host. When a trigger occasion is met, the host sends an image tag of a locally deployed image to a management node. That the trigger occasion is met includes: a preset period expires, or a collection instruction sent by the management node is received, or it is detected that the locally deployed image changes. The collection instruction is used to instruct to send the image tag of the deployed image to the management node.

A tenth aspect of this application provides a host. When a trigger occasion is met, the host sends a layer identifier of a locally deployed image layer to a management node. That the trigger occasion is met includes: a preset period expires, or a collection instruction sent by the management node is received, or it is detected that the locally deployed image layer changes. The collection instruction is used to instruct to send the layer identifier of the deployed image to the management node.

An eleventh aspect of this application provides an image tag sending module. The module runs on a host, so that the host sends an image tag of a locally deployed image to a management node when a trigger occasion is met.

A twelfth aspect of this application provides an image tag sending module. The module runs on a host, so that the host sends a layer identifier of a locally deployed image layer to a management node when a trigger occasion is met.

A thirteenth aspect of this application provides a container system. The container system includes at least two hosts provided in the ninth aspect, and a management node implemented by using the image deployment apparatus provided in the third aspect or the computing device provided in the fifth aspect.

Optionally, after obtaining an image tag of a parent image of a to-be-deployed image, the management node in the container system may further send the image tag of the parent image of the to-be-deployed image to each host. Each host determines a parent image that is of the to-be-deployed image and that has been deployed, and then, each host returns, to the management node, an image tag of the parent image that is of the to-be-deployed image and that has been deployed on each host, so that the management node determines a deployment node. Such a container system offloads some work of the management node to each host, thereby further improving working efficiency of the management node.

A fourteenth aspect of this application provides a container system. The container system includes at least two hosts provided in the tenth aspect, and a management node implemented by using the image deployment apparatus provided in the fourth aspect or the computing device provided in the sixth aspect.

Optionally, after obtaining a layer identifier of an image layer of a to-be-deployed image, the management node in the container system may further send the layer identifier of the image layer of the to-be-deployed image to each host. Each host determines a deployed image layer of the to-be-deployed image, and then, each host returns, to the management node, a layer identifier of the image layer that is of the to-be-deployed image and that has been deployed on each host, so that the management node determines a deployment node. Such a container system offloads some work of the management node to each host, thereby further improving working efficiency of the management node.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show some embodiments of this application.

FIG. 3 is a schematic diagram of an image organization relationship according to an embodiment of this application;

FIG. 4 is a schematic diagram of an organization structure of a computing device according to an embodiment of this application;

DESCRIPTION OF EMBODIMENTS

Figure 1:
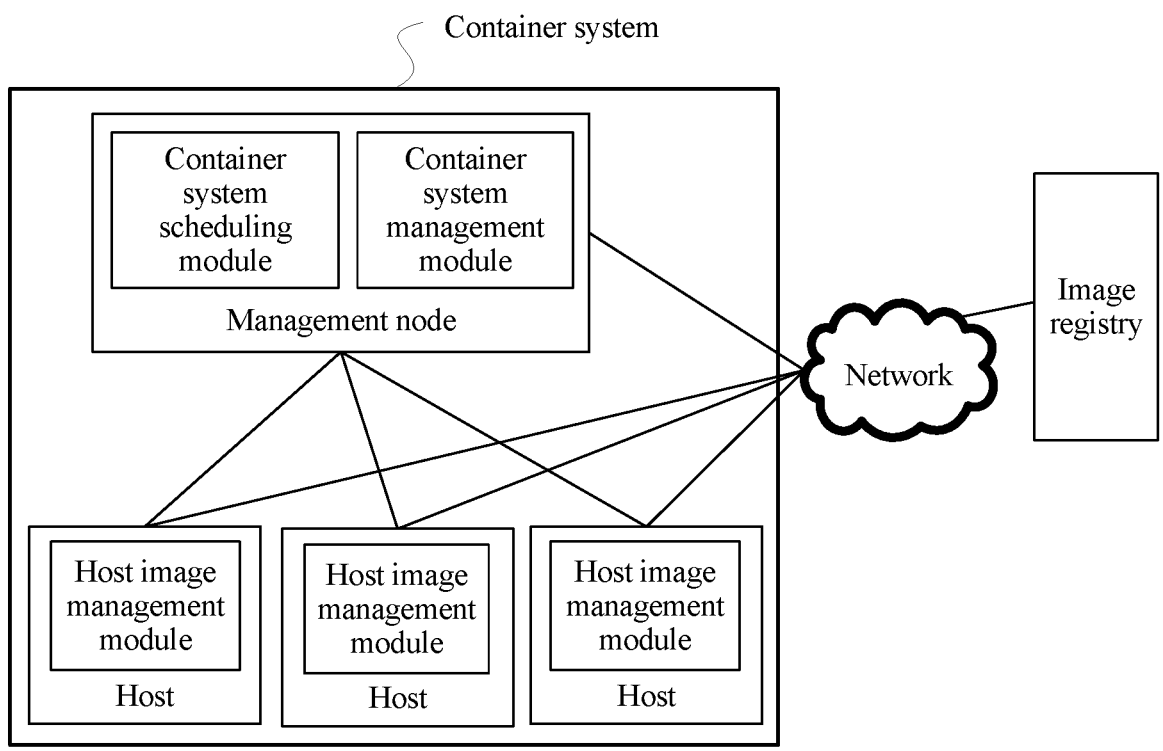
FIG. 1 is a schematic diagram of an architecture of a container system according to an embodiment of this application.

The following describes the technical solutions in the embodiments of this application with reference to the accompanying drawings in the embodiments of this application.

Throughout this specification, an image is a sequential set of parameters for changing a root filesystem and running a corresponding container. The image is a read only file.

An image includes image layers. An image layer includes at least one of metadata corresponding to the image layer or a filesystem change described by the image layer. The metadata corresponding to the image layer is described in a json format and may be referred to as layer metadata. Alternatively, the filesystem change described by the image layer may be referred to as an image filesystem changeset. Different images can share a same image layer, so that the image layer is reused and storage overheads of a host are reduced. In addition, an image can be updated by releasing a new image layer based on an image layer of the original image, improving image update and release efficiency.

The metadata describes basic information of the image layer, such as a creation date, an author, a layer identifier of the image layer, a layer identifier of a parent image layer, and a size of the image layer. The image filesystem changeset of the image layer records an archive of a changed file in the parent image layer of the image layer.

Each image layer is represented by a layer identifier, and each image is represented by an image tag. The layer identifier of the image layer refers to an identifier assigned upon creation of the image layer. The layer identifier of each image layer is unique, and is usually represented by a 256-bit hexadecimal code. The image tag refers to a descriptive name that is provided by a user and that has a mapping relationship with a layer identifier of an image layer. The image tag includes two parts: an application name and a version number of the image. For example, for Mysql:5.4, Mysql is an application name and 5.4 is a version number.

An image except for a base image includes at least two image layers, and each image layer has a unique parent image layer. As shown in FIG. 3, an image whose image tag is Mysql:5.4 includes image layers whose layer identifiers are a layer identifier 1, a layer identifier 2, a layer identifier 3, a layer identifier 4, a layer identifier 5, and a layer identifier 10, a base image, an image layer, which is omitted in FIG. 3, between Mysql:5.3 and Ubuntu:12.10, and an image layer, which is omitted in FIG. 3, between Ubuntu: 12.10 and the base image.

An image except for a base image includes at least one parent image. As shown in FIG. 3, parent images of Mysql: 5.4 include Mysql:5.3, Ubuntu:12.10, and the base image, and parent images of Mongo:2.2 include Ubuntu:12.10 and the base image. Therefore, two images may have a same parent image. If the parent image shared by the two images is not a base image, the two images further include a same image layer.

A base image does not have a parent image. The base image generally includes a part required in an operating system release except for an operating system kernel.

An image is corresponding to a container. The container corresponding to the image includes the image and a read/write layer superimposed on the image. For example, if a container corresponding to an Mysql application whose version is 5.4 needs to run, an image whose image tag is Mysql:5.4 is required to run the container. Multiple containers can run on one host, and these containers may include different base images. However, containers running on one host share an operating system kernel.

An image registry refers to a database that stores image layer information included in images, parent image information included in the images, and multiple image layers. The image registry may be a public image registry. A user accesses the public image registry, such as Docker Hub, over the Internet. Alternatively, a user may create a private image registry in a private data center.

The image registry includes at least one image repository. Each image repository includes n images. Each two images in the n images have a parent-child relationship. A first-layer image is a base image. Parent images of an $n^{th}$-layer image include the first-layer image to an $(n-1)^{th}$-layer image, where n is a natural number greater than or equal to 2. In FIG. 3, two image repositories are included, that is, an image repository 1 including Mysql:5.4, Mysql:5.3, Ubuntu:12.10, and the base image, and an image repository 2 including Mongo:2.2, Ubuntu:12.10, and the base image. In the image repository 1, the base image is the first-layer image, Mysql:5.4 is the $n^{th}$-layer image, and Mysql:5.3 is the $(n-1)^{th}$-layer image. Therefore, for Mysql:5.4, Mysql:5.3 is a top-layer parent image. That is, for an $m^{th}$-layer image, an $(m-1)^{th}$-layer image is a top-layer parent image, and an $(m-2)^{th}$-layer image is a second-top-layer parent image. For Mysql:5.4, a layer identifier of a top-layer image layer is 1, and a layer identifier of a second-top-layer image layer is 2. It should be noted that Mysql:5.3 and parent images of Mysql:5.3 may constitute an image repository 3, and a quantity of images included in the image repository 3 is one less than a quantity of images included in the image repository 1.

An architecture of a container system applied to the embodiments of this application is as follows:

FIG. 1 is a schematic diagram of an architecture of a container system applied to an embodiment of this application. The container system includes a management node and multiple hosts that run containers. A container system scheduling module and a container system management module run on the management node. The container system management module is configured to manage resource utilization information of each host, including central processing unit (CPU) usage, total memory capacity, memory usage, hard disk drive (HDD) or solid state drive (SSD) usage, and the like. The container system management module is further configured to manage information about image layers that have been deployed on the host, and information about images that have been deployed on the host. The container system scheduling module is configured to deploy an image according to the resource utilization information of each host, the information about the images that have been deployed on the host, and the information about the image layers that have been deployed on the host. The container system scheduling module may further manage a container on the host according to a scaling policy. A host image management module runs on the host, and is configured to manage the image that has been deployed on the host. The container system management module and a host image management module on each host may be in a master-slave mode. That is, the host image management modules on the hosts collect image information of the hosts and send the image information of the hosts to the container system management module. The container system scheduling module determines, according to the image information of the hosts that is collected by the container system management module and the resource utilization information of each host, a host for deploying an image, and instructs a host image management module on the host to interact with an image registry to obtain an image layer that is lacking for deployment of the image on the host.

One or more images may be deployed on each host. Generally, one image is deployed on multiple hosts, so that all containers corresponding to the image do not stop running due to a failure of a host.

The host may be a virtual machine or a physical machine. The management node may be a physical machine or a virtual machine. The management node and the host are usually deployed on different physical machines. The container system scheduling module, the container system management module, and the hosts access the image registry by using a network.

Figure 2:
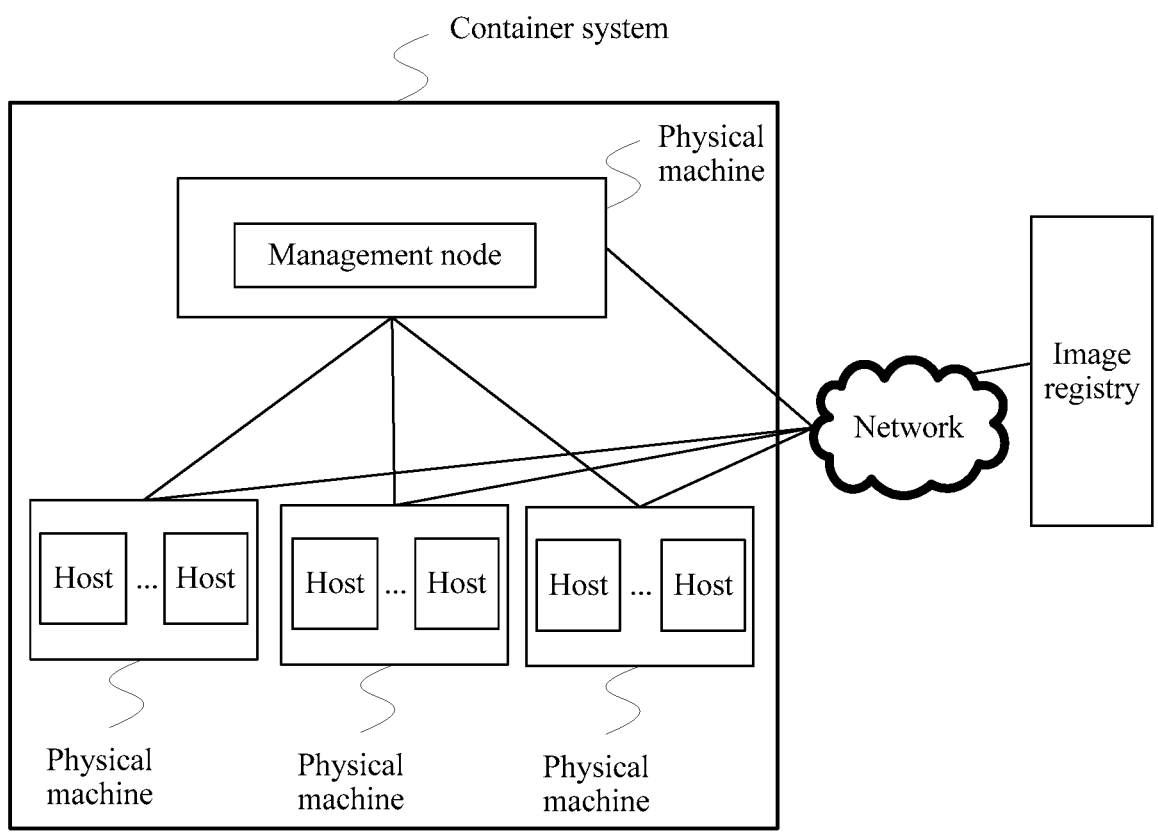
FIG. 2 is a schematic diagram of a physical architecture of a container system according to an embodiment of this application.

A schematic diagram of a physical architecture of a container system is shown in FIG. 2. In this physical architecture, hosts and a management node are virtual machines. Multiple hosts may run on one physical machine. The management node and the hosts run on different physical machines, so that container system management is separated from actual container running. This improves working efficiency and stability of the container system.

The management node in FIG. 1 or FIG. 2 may be implemented by using a computing device 200 in FIG. 4. A schematic diagram of an organization structure of the computing device 200 is shown in FIG. 4. The computing device 200 includes a processor 202 and a memory 204, and may further include a bus 208 and a communications interface 206.

The processor 202, the memory 204, and the communications interface 206 may implement a mutual communication connection by using the bus 208, or may implement communication by other means, for example, wireless transmission.

The memory 204 may include a volatile memory such as a random-access memory (RAM); or the memory may include a non-volatile memory such as a read-only memory (ROM), a flash memory, a hard disk drive (HDD), or a solid state drive (SSD); or the memory 204 may include a combination of the foregoing types of memories. When the technical solutions provided in this application are implemented by using software, program code for implementing an image deployment method provided in FIG. 5 in this application is stored in the memory 204, and is executed by the processor 202.

The computing device 200 communicates with an image registry and hosts in a container system by using the communications interface 206.

The processor 202 may be a central processing unit (CPU).

The processor 202 obtains an image tag of a to-be-deployed image, and obtains, from the image registry, an image tag of a parent image of the to-be-deployed image according to the image tag of the to-be-deployed image. Then, the processor 202 determines at least two to-be-selected hosts from the hosts in the container system. That is, the processor 202 selects, from the hosts according to resource utilization information of each host and a resource utilization requirement of the to-be-deployed image, a to-be-selected host that can meet the resource utilization requirement of the to-be-deployed image. The to-be-selected hosts are selected, so that subsequent processing is performed only on the to-be-selected hosts, without a need to analyze all the hosts in the container system. This improves processing efficiency.

The processor 202 determines, according to the image tag of the parent image of the to-be-deployed image and an image tag of an image that has been deployed on each to-be-selected host, a parent image that is of the to-be-deployed image and that has been deployed on each to-be-selected host; and finally compares the parent images of the to-be-deployed image that have been deployed on the to-be-selected hosts, and specifies a deployment host for the to-be-deployed image according to a comparison result and a predetermined policy. The deployment host is configured to deploy the to-be-deployed image. The predetermined policy may be that a to-be-selected host with a largest quantity of deployed parent images of the to-be-deployed image is selected as the deployment host, or selection may be performed with reference to another parameter such as resource utilization statuses of the to-be-selected hosts.

The deployment host may be a to-be-selected host with a largest quantity of deployed parent images of the to-be-deployed image, or may be a to-be-selected host, which is selected from the at least two to-be-selected hosts with reference to another policy, with a relatively large quantity of deployed parent images of the to-be-deployed image. The deployment host is selected, so that the deployment host needs to download a relatively small amount of data when downloading the to-be-deployed image, thereby improving an image deployment speed.

When a trigger occasion is met, the processor 202 may further obtain and store an image tag of an image that has been deployed on each host in the container system. That the trigger occasion is met includes: when a preset period for obtaining the image tag of the image that has been deployed on each host expires, the management node needs to obtain the image tag of the image that has been deployed on each host, to update an image status of each host stored on the management node; or when a container deployment instruction such as a request for deploying a container that is sent by a user is received, in order to deploy the container, the management node needs to obtain the image tag of the image that has been deployed on each host, to select a deployment host for the container; or when a collection instruction sent by a user to the management node is received, the management node is instructed to collect and store the image tag of the image that has been deployed on each host.

Figure 5:
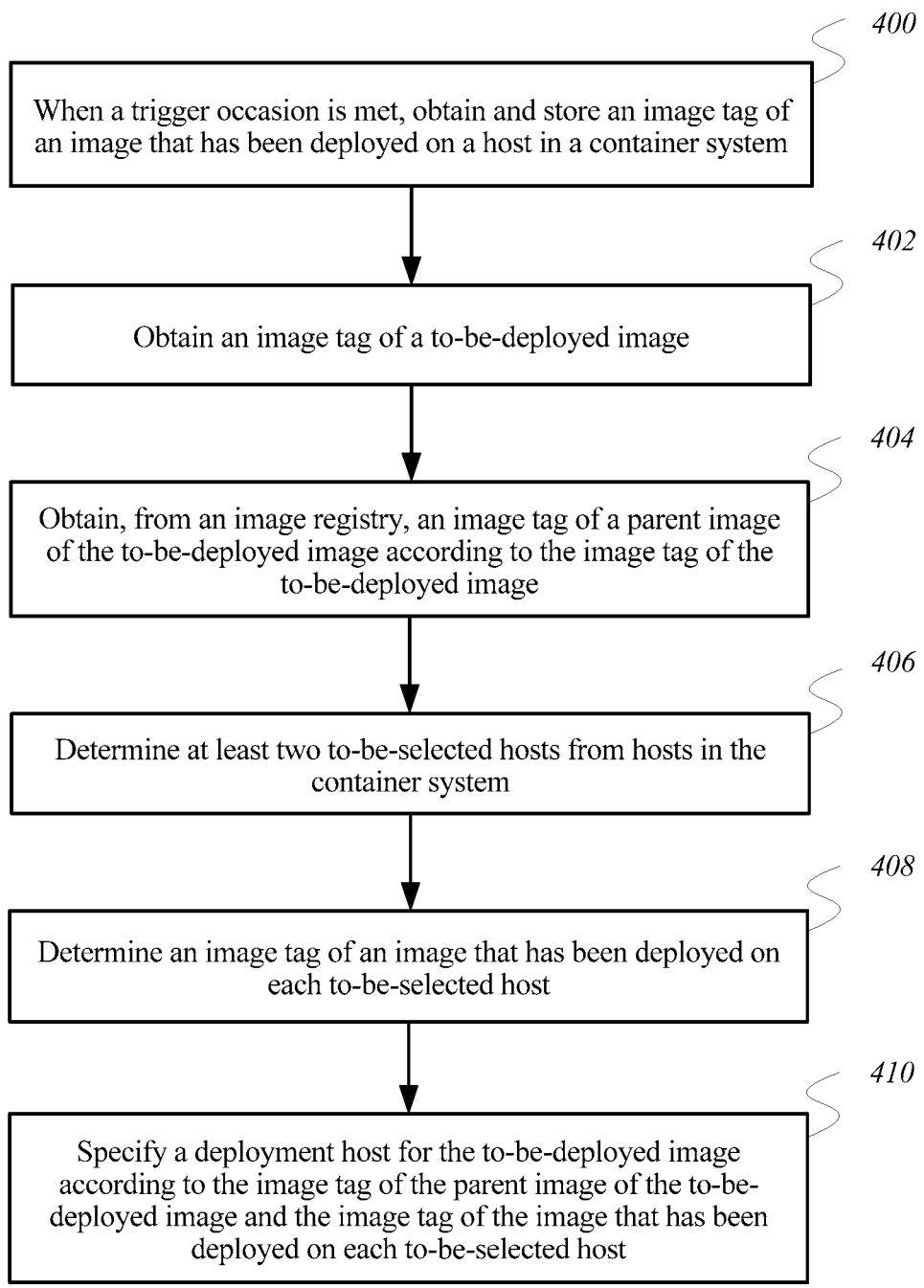
FIG. 5 is a schematic flowchart of an image deployment method according to an embodiment of this application.

This application further provides an image deployment method. When running, the management node in FIG. 1 and FIG. 2 and the computing device 200 in FIG. 4 execute the method. A schematic flowchart of the method is shown in FIG. 5.

Step 402: The management node obtains an image tag of a to-be-deployed image.

When a container system needs to deploy a container, the management node obtains an image tag of a to-be-deployed image corresponding to the to-be-deployed container. In a common scenario, if the container system needs to start a container according to a scaling policy preset in the container system or a request sent by a user, the management node receives an image tag of an image corresponding to the container, that is, the image tag of the to-be-deployed image.

Optionally, step 400 is further performed. Step 400 and step 402 may not be performed consecutively, and step 400 needs to be performed at least once before step 402 is performed.

Step 400: When a trigger occasion is met, the management node obtains and stores an image tag of an image that has been deployed on each host in a container system.

Optionally, the management node obtains image tags of all images that have been deployed on each host, so that subsequent deployment host selection is more accurate.

Optionally, that the trigger occasion is met includes: a preset period expires, or a container deployment instruction is received, or a collection instruction sent by a user is received. The collection instruction is used to instruct to collect and store the image tag of the image that has been deployed on the host in the container system. When the preset period expires, the management node obtains the image tag of the image that has been deployed on each host, to update an image tag, which is stored on the management node, of an image that has been deployed on the host. Alternatively, the management node may send an instruction to each host when receiving the container deployment instruction, to request each host to report the image tag of the image that has been deployed on each host. Alternatively, the management node may send an instruction to each host after receiving the collection instruction sent by the user, to request each host to report the image tag of the image that has been deployed on each host.

It should be noted that, when selecting a deployment host of the to-be-deployed image in an image deployment process, the management node may use image tags of only some images that have been deployed on each host. Therefore, in step 400, the image tags of some images that have been deployed on each host may be obtained. For example, an image tag of a base image that has been deployed on each host may not be obtained.

It should be noted that, when selecting a deployment host of the to-be-deployed image in an image deployment process, the management node may select the deployment host of the to-be-deployed image only from some hosts in the container system. Therefore, in step 400, the management node may obtain and store only image tags of images that have been deployed on the some hosts in the container system. Commonly, it may be preset that some hosts in the container system do not participate in deployment of the currently to-be-deployed image, and therefore, in step 400, the management node does not need to obtain image tags of images that have been deployed on these hosts.

The image tags, which are obtained by the management node, of the images that have been deployed on each host may have a dependency relationship or may not have a dependency relationship. In an example, statuses of images deployed on a host 1 are shown in FIG. 3. Image tags, which are stored on the management node, of the images that have been deployed on the host 1 are represented in the following manners:

Manner 1: The management node obtains image tags, which have a dependency relationship, of images included in each image repository, for example, Mysql:5.4—Mysql:5.3—Ubuntu:12.10—a base image in an image repository 1 and Mongo:2.2—Ubuntu:12.10—the base image in an image repository 2, and "—" indicates that a current image is a parent image of a previous image.

Manner 2: The management node obtains image tags, which do not have a dependency relationship, of images included in each image repository, for example, Mysql:5.4, Ubuntu:12.10, Mysql:5.3, and a base image in an image repository 1; and Ubuntu:12.10, Mongo:2.2, and the base image in an image repository 2. In the manner 2, the host 1 needs to report only the image tags included in each image repository, and may not indicate a dependency relationship among the images in each image repository. Further, in the manner 2, image tags of same images included in different image repositories may be combined. For example, in the image repository 1 and the image repository 2, Ubuntu: 12.10 and the base image are common, and the host 1 needs to report only the image tags of the images that have been deployed on the host 1, including Mysql:5.4, Ubuntu:12.10, Mysql:5.3, the base image, and Mongo:2.2. Before reporting, the host 1 combines the image tags of the images that have been deployed on the host 1. This can reduce an amount of data to be uploaded to the management node, and improve working efficiency of the management node.

Figure 6:
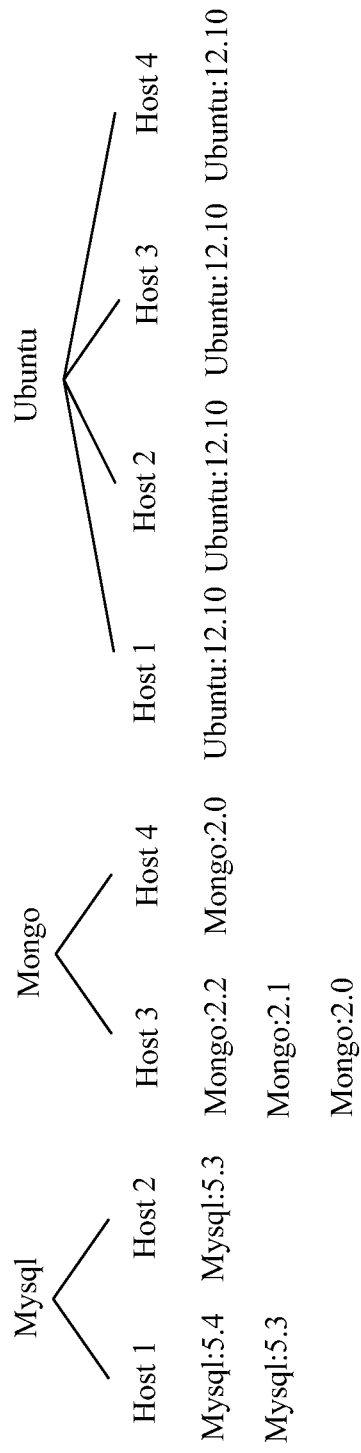
FIG. 6 is a schematic diagram of an image tag storage structure according to an embodiment of this application.

Further, after obtaining the image tags of the images that have been deployed on each host, the management node may further process the image tags of the images that have been deployed on each host, and then store processed image tags in a manner 3. FIG. 6 is used as an example. If obtaining image tags of images that have been separately deployed on the host 1 to a host 4, the management node may record, according to application names included in the image tags of the images that have been deployed on the hosts and by using the applications as indexes, the image tags of the images that have been deployed on the hosts. In the manner 3, if the management node needs to obtain, by means of a query, hosts on which an image corresponding to an application Mysql is deployed, the management node does not need to perform screening on all the hosts, and can obtain the host 1 and the host 2 only according to the application name Mysql. This improves efficiency of the management node for determining a host for deploying the to-be-deployed image.

Step 404: The management node obtains, from an image registry, an image tag of a parent image of the to-be-deployed image according to the image tag of the to-be-deployed image.

Optionally, the management node obtains, from the image registry, image tags of all parent images of the to-be-deployed image, so that subsequent deployment host selection is more accurate.

Optionally, the management node may locally store image tags of parent images of some images. If the to-be-deployed image is one of these images, the management node does not need to request, from the image registry, the image tag of the parent image of the to-be-deployed image.

It should be noted that, in step 400, image tags of some images that have been deployed on each host may be obtained, and correspondingly, in step 404, the management node may also obtain image tags of some parent images of the to-be-deployed image from the image registry, for example, does not obtain an image tag of a base image in the parent images of the to-be-deployed image.

In step 404, the image tags that are of the parent images of the to-be-deployed image and that are obtained from the image registry may have a dependency relationship. In an example, the image tag of the to-be-deployed image is Mysql:5.4. The obtained image tags of the parent images of the image are, for example, Mysql:5.4—Mysql:5.3—Ubuntu:12.10—the base image. The obtained image tags of the parent images of the to-be-deployed image may not have a dependency relationship. The obtained image tags of the parent images of the image are, for example, Mysql:5.4, Ubuntu:12.10, Mysql:5.3, and the base image.

Step 406: The management node determines at least two to-be-selected hosts from the hosts in the container system.

Optionally, before step 406, the management node further obtains resource utilization information of each host in the container system. The step 406 includes: determining, according to the resource utilization information of each host in the container system, the at least two to-be-selected hosts that meet a resource utilization requirement of the to-be-deployed image. The to-be-selected hosts are selected, so that the management node only needs to select a deployment node from the to-be-selected hosts in a subsequent step, thereby improving working efficiency of the management node. Because the to-be-selected hosts need to meet the resource utilization requirement of the to-be-deployed image, the deployment node selected from the to-be-selected hosts can necessarily meet the resource utilization requirement of the to-be-deployed image, thereby improving a success rate for deployment of the to-be-deployed image.

When a user sends a request to the management node, to request the management node to deploy the to-be-deployed image, the user may also send an expected resource utilization requirement of the to-be-deployed image, such as CPU usage, memory usage, and a total memory capacity of a host for deploying the image. If the user does not send the resource utilization requirement of the to-be-deployed image, the management node may query for a historical resource utilization request of a deployed image and use the resource utilization requirement that is of the to-be-deployed image and that is stored in the historical resource utilization request. Then, the management node determines, with reference to the resource utilization information of each host and the resource utilization requirement of the to-be-deployed image, the at least two to-be-selected hosts that can meet the resource utilization requirement of the to-be-deployed image.

It should be noted that a sequence for performing step 404 and step 406 is not limited. Especially, if step 406 is first performed, and the management node can determine, from the hosts in the container system, only one to-be-selected host that can meet the resource utilization requirement of the to-be-deployed image, the management node does not need to perform step 404 and steps following step 406, and directly selects the to-be-selected host as the deployment host of the to-be-deployed image.

Step 408: The management node determines an image tag of an image that has been deployed on each to-be-selected host.

In step 400, the management node has obtained the image tags of the images that have been deployed on the hosts in the container system. The management node obtains the image tag of the image that has been deployed on each to-be-selected host from the image tags.

Step 410: The management node specifies a deployment host for the to-be-deployed image according to the image tag of the parent image of the to-be-deployed image and the image tag of the image that has been deployed on each to-be-selected host, where the deployment host is configured to deploy the to-be-deployed image, and a parent image that is of the to-be-deployed image and that has been deployed on the deployment host meets a predetermined policy.

Step 410 may include: matching the image tag of the parent image of the to-be-deployed image with the image tag of the image that has been deployed on each to-be-selected host, to determine a parent image that is of the to-be-deployed image and that has been deployed on each to-be-selected host; and comparing the parent images of the to-be-deployed image that have been deployed on the to-beselected hosts, and specifying the deployment host according to a comparison result and the predetermined policy, where the predetermined policy is that a to-be-selected host with a largest quantity of deployed parent images of the to-be-deployed image is selected as the deployment host from the at least two to-be-selected hosts.

It should be noted that, after the parent image that is of the to-be-deployed image and that has been deployed on each to-be-selected host is obtained, a size of an image layer that each to-be-selected host lacks relative to the to-be-deployed image may be further obtained, and the deployment host is selected with reference to a resource utilization status of each to-be-selected host. Therefore, in actual application, although the predetermined policy is designed, a finally selected deployment host may not be a to-be-selected host with a largest quantity of parent images of the to-be-deployed image.

In step 410, the manner of determining, by the management node, the parent images of the to-be-deployed image that have been deployed on the to-be-selected hosts varies with the representation manner of the image tags, stored on the management node in step 400, of the images that have been deployed on the hosts, and whether the image tags of the parent images of the to-be-deployed image, obtained from the image registry in step 404, have a dependency relationship. In an example, the image tag of the to-be-deployed image is Mysql:5.4. The image tags that are of the parent images of the to-be-deployed image and that are obtained by the management node may be Mysql:5.4—Mysql:5.3—Ubuntu:12.10-the base image that have a dependency relationship; or Mysql:5.4, Ubuntu:12.10, Mysql:5.3, and the base image that do not have a dependency relationship.

If in step 404, the image tags that are of the parent images of the to-be-deployed image and that are obtained from the image registry do not have a dependency relationship, the image tags of the parent images of the to-be-deployed image and the image tag of the parent image that is of the to-be-deployed image and that has been deployed on each to-be-selected host need to be matched one by one, so that the parent image that is of the to-be-deployed image and that has been deployed on each to-be-selected host is determined.

If in step 404, the image tags that are of the parent images of the to-be-deployed image and that are obtained from the image registry have a dependency relationship.

In the manner 1, because image tags that are of deployed images and that are reported by each to-be-selected host have a dependency relationship, if the image tags that are of the parent images of the to-be-deployed image and that are obtained in step 404 also have a dependency relationship, a currently to-be-selected host is first determined from the selected to-be-selected hosts, and then, the image tag of the to-be-deployed image is matched with an image tag of an image that has been deployed on the currently to-be-selected host. Matching may be performed in a matching sequence from a top-layer image to a base image, and the following steps are included. Step 1: Match the image tag of the to-be-deployed image with the image tag of the image that has been deployed on the currently to-be-selected host; and if matching is successful, determine that the to-be-deployed image and all the parent images of the to-be-deployed image have been deployed on the currently to-be-selected host, or perform step 2 if matching is unsuccessful. Step 2: Match an image tag of a top-layer parent image of the to-be-deployed image with the image tag of the image that has been deployed on the currently to-be-selected host; and if matching is successful, determine that all parent images of the to-be-deployed image have been deployed on the currently to-be-selected host, or perform step 3 if matching is unsuccessful. Step 3: Match an image tag of a current image with the image tag of the image that has been deployed on the currently to-be-selected host, where the current image is a top-layer parent image of the parent image that is of the to-be-deployed image and on which matching has been performed in the previous step; and if matching is successful, determine that all the parent images of the current image have been deployed on the currently to-be-selected host, or if matching is unsuccessful, perform step 3 again until matching is performed on each parent image of the to-be-deployed image. In any step, if an image tag is matched on the currently to-be-selected host, no further step is performed. After one to-be-selected host is specified as the currently to-be-selected host and performs the foregoing steps, another to-be-selected host is specified to perform the foregoing steps until all the to-be-selected hosts perform the foregoing steps. After that, the parent image that is of the to-be-deployed image and that has been deployed on each to-be-selected host is determined.

Figure 7:
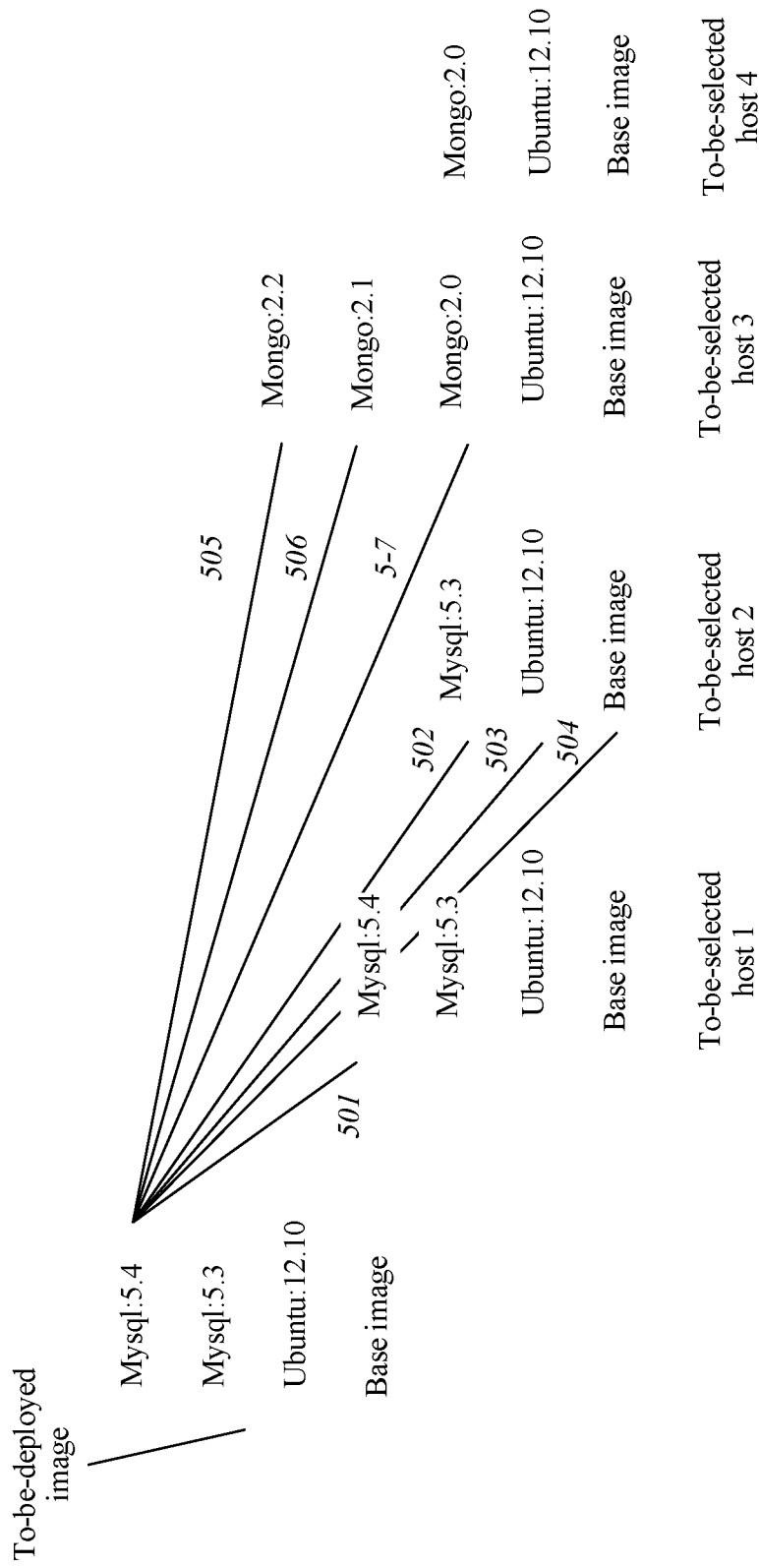
FIG. 7(*a*) to FIG. 7(*d*) are schematic diagrams of image tag matching procedures according to an embodiment of this application.
Figure 7:
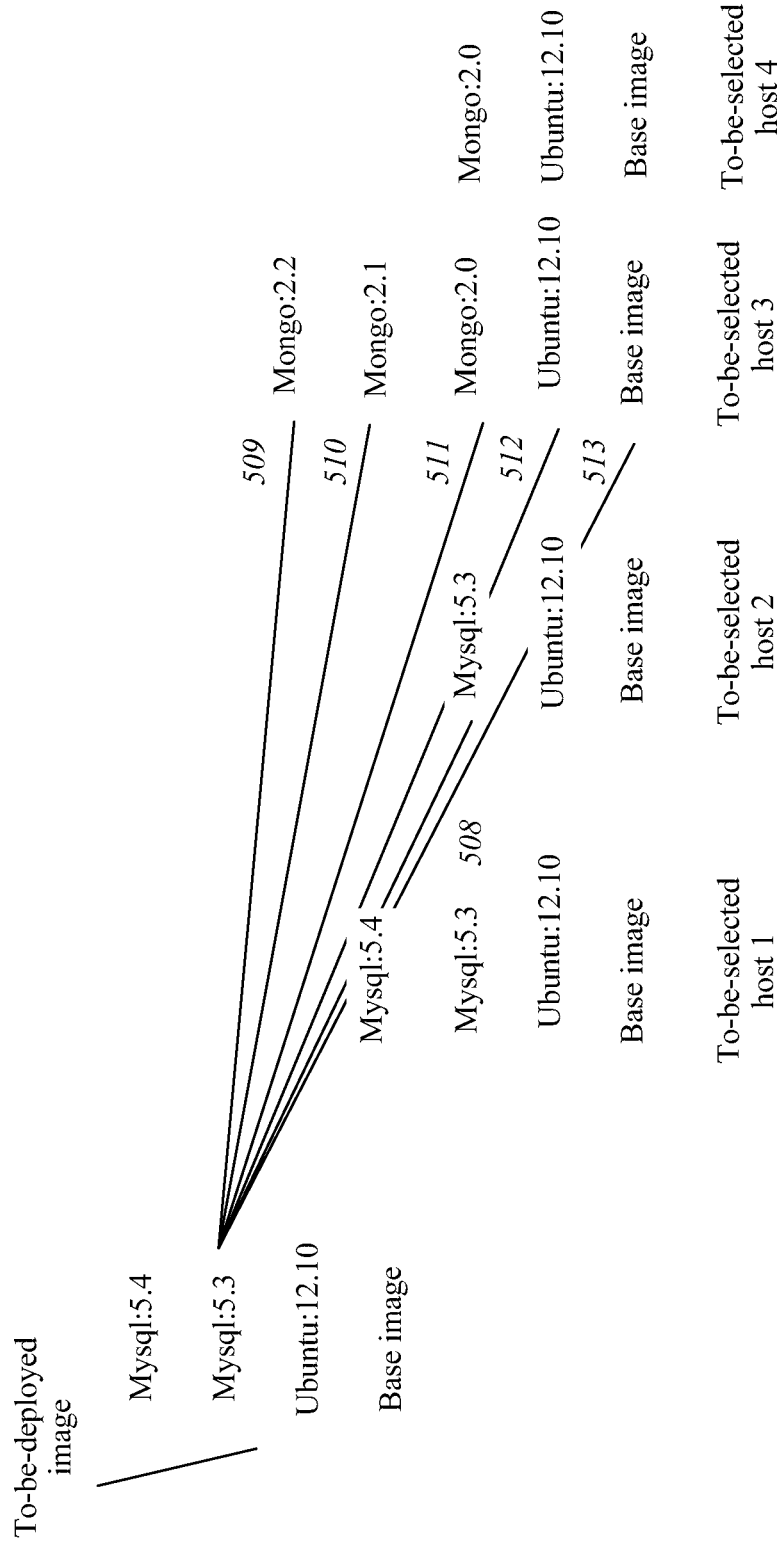
Figure 7:
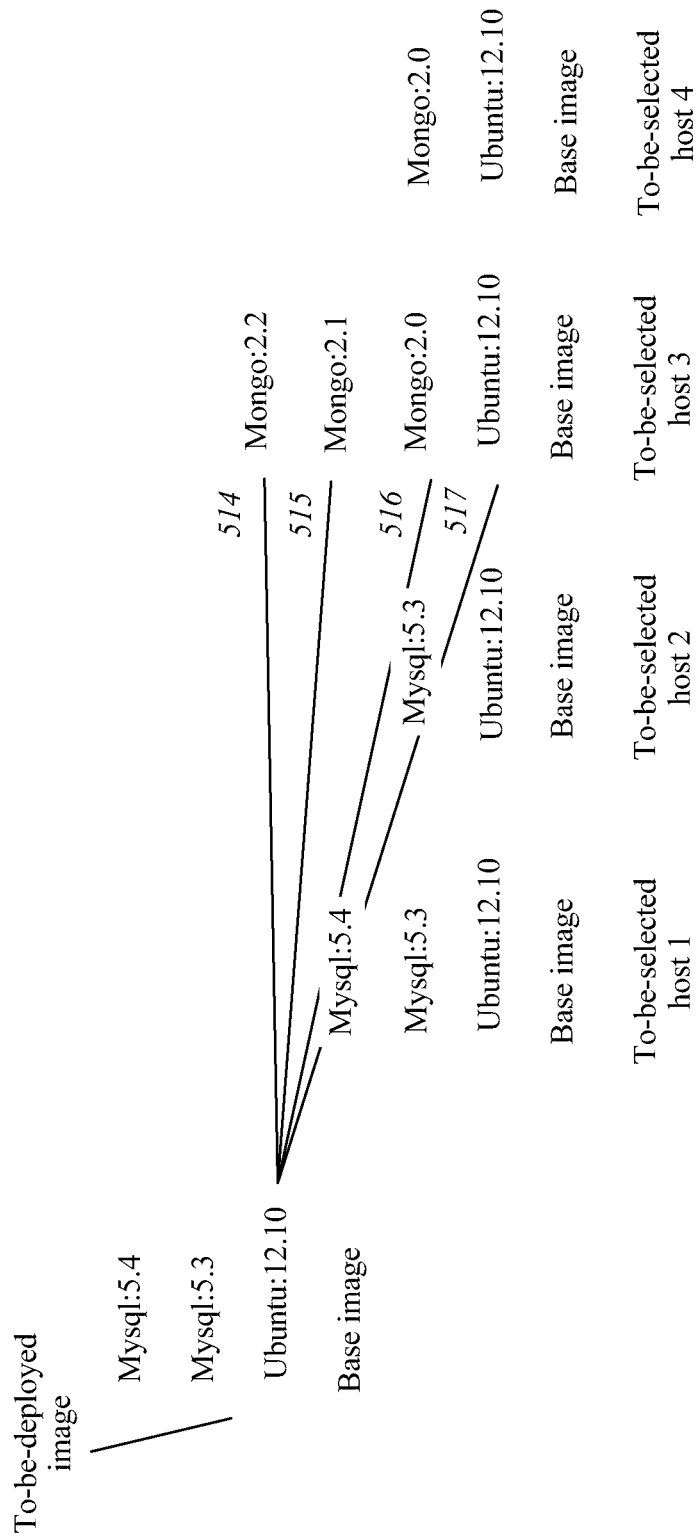
Figure 7:
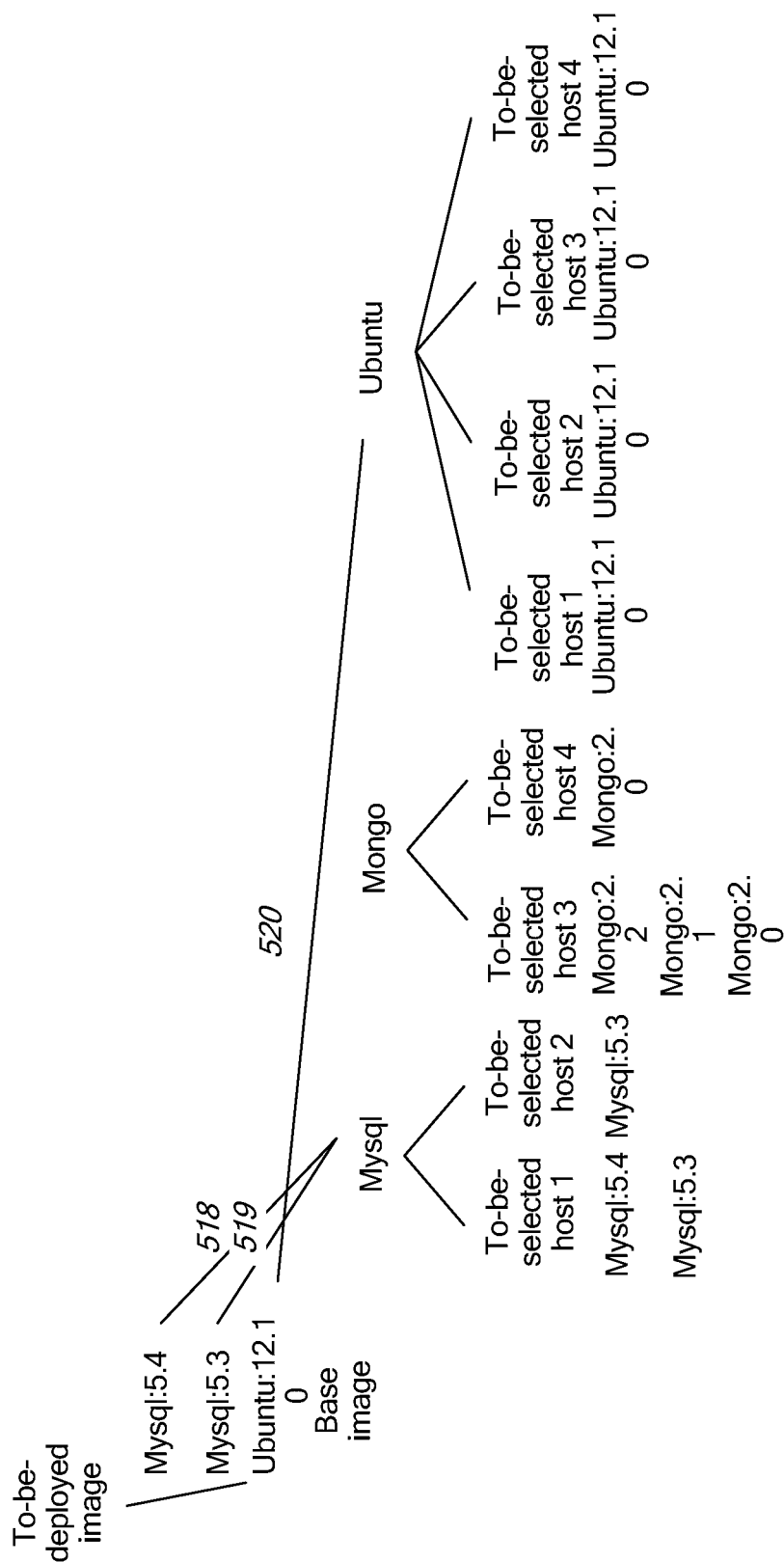

As shown in FIG. 7 (a), Mysql:5.4 is matched with the image tag of the image that has been deployed on each to-be-selected host. If Mysql:5.4 is successfully matched on a to-be-selected host, no matching needs to be further performed on the to-be-selected host because image tags of images that have been deployed on the to-be-selected host have a dependency relationship, for example, 501. If Mysql:5.4 is not matched on a to-be-selected host in a matching process, downward matching is performed on an image tag of an image that has been deployed on the to-be-selected host until matching is performed on all image tags, for example, 502, 503, and 504. A part of a matching process of the to-be-selected host 3 and a matching process of the to-be-selected host 4 are omitted in the figure. The to-be-deployed image has been deployed on a to-be-selected host on which the image tag of the to-be-deployed image is matched. That is, Mysql:5.4 has been deployed on the to-be-selected host 1, and all parent images of Mysql:5.4 have been deployed on the to-be-selected host 1.

Then, the image tag of the top-layer parent image of the to-be-deployed image is matched with an image tag of an image that has been deployed on a to-be-selected host except the host 1 in the at least two to-be-selected hosts. A parent image of the to-be-deployed image has been deployed on a to-be-selected host on which the image tag of the top-layer parent image of the to-be-deployed image is successfully matched. As shown in FIG. 7(b), Mysql:5.3 is matched on each to-be-selected host. No matching needs to be further performed on a to-be-selected host on which matching is successful in the previous step. A specific matching process is shown in 508 to 513. A matching process of the to-be-selected host 4 is omitted in the figure. All the parent images of the to-be-deployed image have been deployed on a to-be-selected host on which the image tag of the top-layer parent image of the to-be-deployed image is successfully matched. That is, all the parent images of Mysql:5.4 have been deployed on the to-be-selected host 2.

Then, an image tag of a second-top-layer parent image of the to-be-deployed image is matched with an image tag of an image that has been deployed on a to-be-selected host in the at least two to-be-selected hosts, where the to-be-selected host is a host on which matching is unsuccessful in the previous step. All parent images except the top-layer parent image of the to-be-deployed image have been deployed on a to-be-selected host on which the image tag of the secondtop-layer parent image of the to-be-deployed image is successfully matched. As shown in FIG. 7(c), Ubuntu:12.10 is matched on each to-be-selected host, and no matching needs to be further performed on the to-be-selected host on which matching is successful in the previous step. A specific matching process is shown in 514 to 517. The parent images except the top-layer parent image of the to-be-deployed image have been deployed on the to-be-selected host on which the image tag of the second-top-layer parent image of the to-be-deployed image is successfully matched. That is, Ubuntu:12.10 and the base image have been deployed on the to-be-selected host 3. This step is repeatedly performed. After a parent image of the to-be-deployed image is matched on each to-be-selected host, a top-layer parent image of the parent image is matched on a remaining to-be-selected host until matching is performed on the image tag of the image that has been deployed on each to-be-selected host.

In the foregoing method for obtaining a parent image that is of the to-be-deployed image and that has been deployed on each to-be-selected host, the to-be-deployed image does not need to be compared with all parent images of the to-be-deployed image that have been deployed on each to-be-selected host, thereby improving matching efficiency.

In the manner 2, a to-be-selected host reports, to the management node, image tags that are of images included in each image repository and that do not have a dependency relationship. Therefore, to determine the parent image that is of the to-be-deployed image and that has been deployed on the to-be-selected host, the image tag of the parent image of the to-be-deployed image needs to be compared with stored image tags of images that have been deployed on the at least two to-be-selected hosts, so that the parent image that is of the to-be-deployed image and that has been deployed on each to-be-selected host can be obtained.

The manner 3 differs from the manner 1 in that, first, an application in the image tag of the to-be-deployed image is used as an index, to query the image tag, which is stored on the management node, of the image that has been deployed on each host. As shown in FIG. 7(d), it may be learned from 518 that Mysql:5.4 is deployed only on the to-be-selected host 1, it may be learned from 519 that Mysql:5.3 is deployed only on the to-be-selected host 3, and it may be learned from 520 that Ubuntu:12.10 is deployed on the to-be-selected hosts 1 to 4. According to such an image tag storage structure, the management node can more quickly obtain the parent image that is of the to-be-deployed image and that has been deployed on each to-be-selected host. In the foregoing method for obtaining a parent image that is of the to-be-deployed image and that has been deployed on each to-be-selected host, the to-be-deployed image does not need to be compared with all parent images of the to-be-deployed image that have been deployed on each to-be-selected host, thereby improving matching efficiency.

Step 400 to step 410 may be performed by a container system management module of the management node. After determining the deployment host in step 410, the container system management module sends an identifier of the deployment host to a container system scheduling module. The container system scheduling module instructs, according to the identifier of the deployment host, the deployment host to deploy the to-be-deployed image.

In the image deployment method corresponding to FIG. 5, a degree of overlapping between an image that has been deployed on each host and a parent image included in a to-be-deployed image is determined, and a host that needs to download fewer images in a deployment process is selected to deploy the to-be-deployed image. This effectively improves a deployment speed of the to-be-deployed image.

The management node in FIG. 1 or FIG. 2 may also be implemented by using a computing device with a same structure as that of the computing device 200 in FIG. 4. The computing device includes a processor and a memory, and may further include a bus and a communications interface.

The processor, the memory, and the communications interface may implement a mutual communication connection by using the bus, or may implement communication by other means, for example, wireless transmission.

The memory may include a volatile memory such as a RAM; or may include a non-volatile memory such as a ROM, a flash memory, an HDD, or an SSD; or may include a combination of the foregoing types of memories. When the technical solutions provided in this application are implemented by using software, program code for implementing an image deployment method provided in FIG. 8 in this application may be stored in the memory, and is executed by the processor.

The computing device communicates with an image registry and hosts in a container system by using the communications interface.

The processor may be a CPU. The processor obtains an image tag of a to-be-deployed image, and obtains, from the image registry, a layer identifier of an image layer of the to-be-deployed image according to the image tag of the to-be-deployed image. Then, the processor determines at least two to-be-selected hosts from the hosts in the container system. That is, the processor selects, from the hosts according to resource utilization information of each host and a resource utilization requirement of the to-be-deployed image, a to-be-selected host that can meet the resource utilization requirement of the to-be-deployed image. The to-be-selected hosts are selected, so that subsequent processing is performed only on the to-be-selected hosts, without a need to analyze all the hosts in the container system. This improves processing efficiency.

The processor determines, according to the layer identifier of the image layer of the to-be-deployed image and a layer identifier of an image layer that has been deployed on each to-be-selected host, an image layer that is of the to-be-deployed image and that has been deployed on each to-be-selected host; and finally compares the layer identifiers of the image layers of the to-be-deployed image that have been deployed on the to-be-selected hosts, and specifies a deployment host for the to-be-deployed image according to a comparison result and a predetermined policy. The deployment host is configured to deploy the to-be-deployed image. The predetermined policy may be that a to-be-selected host with a largest quantity of deployed image layers of the to-be-deployed image is selected as the deployment host, or selection may be performed with reference to another parameter such as resource utilization statuses of the to-be-selected hosts.

When a trigger occasion is met, the processor may further obtain and store a layer identifier of an image layer that has been deployed on each host in the container system. That the trigger occasion is met includes: when a preset period for obtaining the layer identifier of the image layer that has been deployed on each host expires, the management node needs to obtain the layer identifier of the image layer that has been deployed on each host, to update an image status of each host stored on the management node; or when a container deployment instruction such as a request for deploying a container that is sent by a user is received, in order to deploy the container, the management node needs to obtain the layer identifier of the image layer that has been deployed on each host, to select a deployment host of the container; or when a collection instruction sent by a user to the management node is received, the management node is instructed to collect and store the layer identifier of the image layer that has been deployed on each host.

The deployment host is selected, so that the deployment host needs to download a relatively small amount of data when downloading the to-be-deployed image, thereby improving an image deployment speed.

Figure 8:
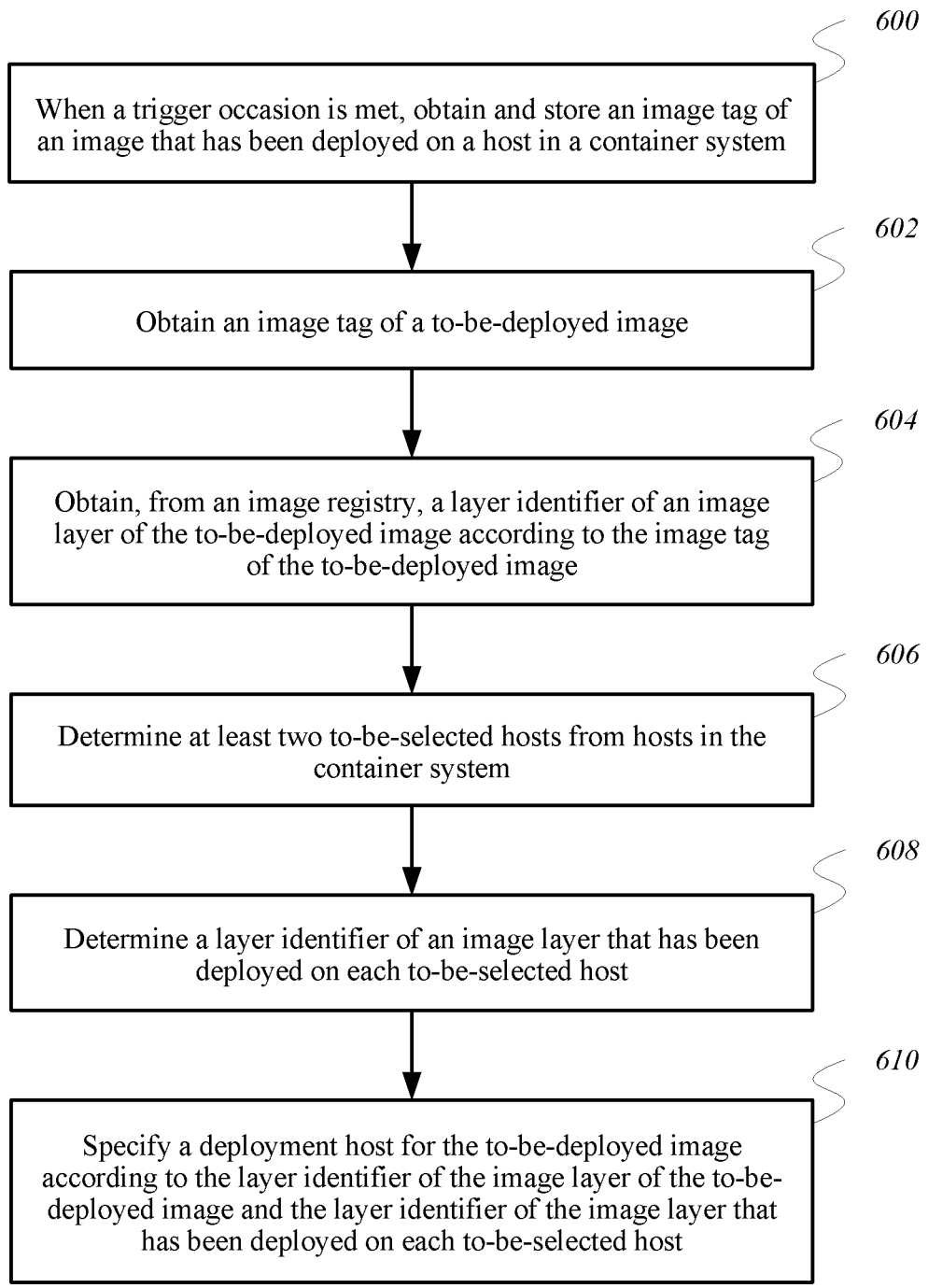
FIG. 8 is a schematic flowchart of another image deployment method according to an embodiment of this application.

This application further provides an image deployment method. When running, the management node in FIG. 1 and FIG. 2 and the computing device described above execute the method. A schematic flowchart of the method is shown in FIG. 8.

Step 602: The management node obtains an image tag of a to-be-deployed image.

When a container system needs to deploy a container, the management node obtains an image tag of a to-be-deployed image corresponding to the to-be-deployed container. In a common scenario, if the container system needs to start a container according to a scaling policy preset in the container system or a request sent by a user, the management node receives an image tag of an image corresponding to the container, that is, the image tag of the to-be-deployed image.

Optionally, step 600 is further performed. Step 600 and step 602 may not be performed consecutively, and step 600 needs to be performed at least once before step 602 is performed.

Step 600: When a trigger occasion is met, the management node obtains and stores layer identifiers of image layers that have been deployed on hosts in a container system.

Optionally, the management node obtains, from hosts, layer identifiers of all image layers that have been deployed on the hosts, so that subsequent deployment host selection is more accurate.

Optionally, that the trigger occasion is met includes: a preset period expires, or a container deployment instruction is received, or a collection instruction sent by a user is received. The collection instruction is used to instruct to collect and store the layer identifier of the image layer that has been deployed on the host in the container system. When the preset period expires, the management node obtains the layer identifier of the image layer that has been deployed on each host, to update a layer identifier, which is stored on the management node, of an image layer that has been deployed on the host. Alternatively, the management node may send an instruction to each host when receiving the container deployment instruction, to request each host to report the layer identifier of the image layer that has been deployed on each host. Alternatively, the management node may send an instruction to each host after receiving the collection instruction sent by the user, to request each host to report the layer identifier of the image layer that has been deployed on each host.

It should be noted that, when selecting a deployment host of the to-be-deployed image in an image deployment process, the management node may use layer identifiers of only some image layers that have been deployed on each host. Therefore, in step 600, the layer identifiers of the some image layers that have been deployed on each host may be obtained.

It should be noted that, when selecting a deployment host of the to-be-deployed image in an image deployment process, the management node may select the deployment host of the to-be-deployed image only from some hosts in the container system. Therefore, in step 600, the management node may obtain and store only layer identifiers of image layers that have been deployed on some hosts in the container system. Commonly, it may be preset that some hosts in the container system do not participate in deployment of the currently to-be-deployed image, and therefore, in step 600, the management node does not need to obtain layer identifiers of image layers that have been deployed on these hosts.

The layer identifiers, which are obtained by the management node, of the image layers that have been deployed on each host may have a dependency relationship or may not have a dependency relationship. In an example, statuses of images deployed on a host 5 are shown in FIG. 3. Layer identifiers, which are stored on the management node, of image layers that have been deployed on the host 5 are represented the following manners:

Manner 4: The host 5 reports, to the management node, layer identifiers, which have a dependency relationship, of image layers in each image repository, for example, a layer identifier 1—a layer identifier 2—a layer identifier 3—a layer identifier 4—a layer identifier 5—a layer identifier 10 in an image repository 1, and a layer identifier 7—a layer identifier 8—the layer identifier 10 in an image repository 2, and "—" indicates that a current image layer is a parent image layer of a previous image layer.

Manner 5: The host 5 reports, to the management node, layer identifiers, which do not have a dependency relationship, of image layers in each image repository, for example, a layer identifier 1, a layer identifier 3, a layer identifier 2, a layer identifier 5, a layer identifier 4, and a layer identifier 10 in an image repository 1; and a layer identifier 8, a layer identifier 7, and the layer identifier 10 in an image repository 2. In the manner 5, the host 5 needs to report only the layer identifiers of the images included in each image repository, and may not indicate a dependency relationship among the image layers in each image repository. Further, in the manner 5, layer identifiers of same image layers in different image repositories may be combined. For example, in the image repository 1 and the image repository 2, the layer identifier 10 is common, and the host 5 needs to report only image tags of images that have been deployed on the host 5, including the layer identifier 1 to the layer identifier 10. Before reporting, the host 5 combines the layer identifiers of the image layers that have been deployed on the host 5. This can reduce an amount of data to be uploaded to the management node, and improve working efficiency of the management node.

Figure 9:
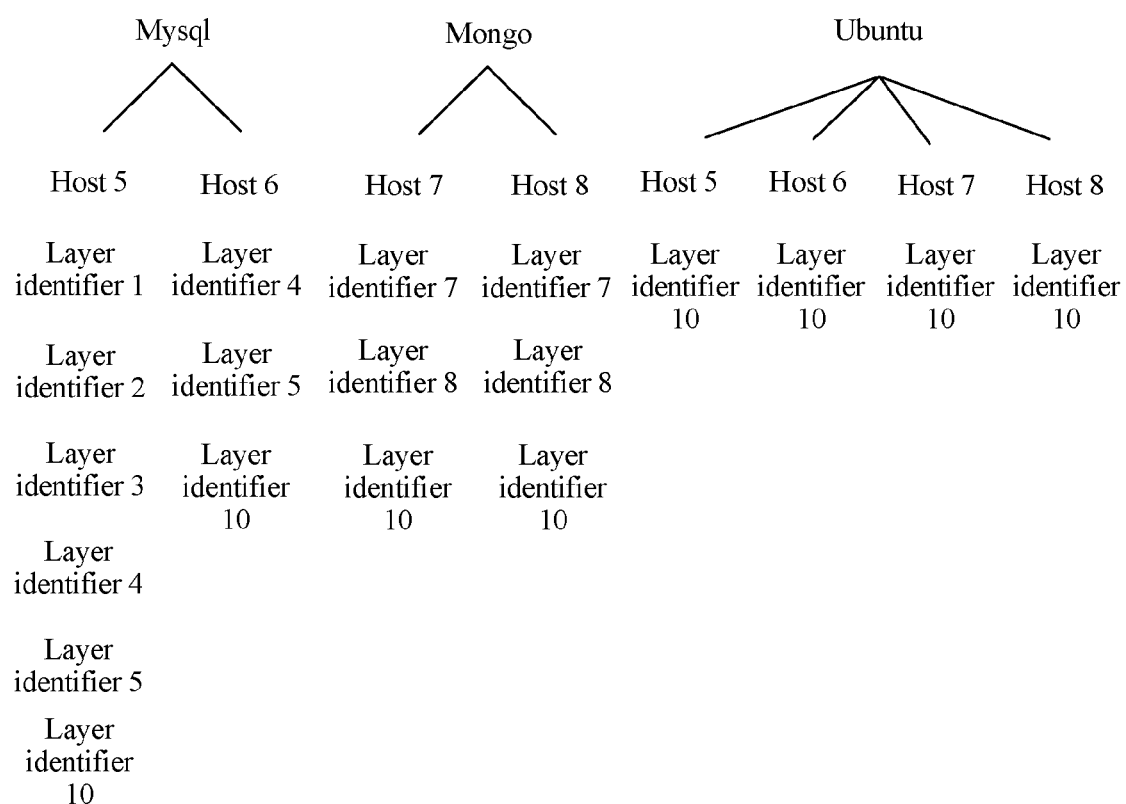
FIG. 9 is a schematic diagram of a storage structure of a layer identifier of an image layer according to an embodiment of this application.

Further, after obtaining the layer identifiers of the image layers that have been deployed on each host, the management node may further process the layer identifiers of the image layers that have been deployed on each host, and then store processed layer identifiers in a manner 6. FIG. 9 is used as an example. If obtaining layer identifiers of image layers that have been separately deployed on the host 5 to a host 8, the management node may record, according to application names included in the layer identifiers of the image layers that have been deployed on the hosts and by using the applications as indexes, the layer identifiers of the image layers that have been deployed on the hosts. In the manner 6, if the management node needs to obtain, by means of a query, hosts on which an image layer corresponding to an application Mysql is deployed, the management node does not need to perform screening on all the hosts, and can obtain the host 5 and the host 6 only according to the application name Mysql. This improves efficiency of the management node for determining a host for deploying the to-be-deployed image.

Step 604: The management node obtains, from an image registry, a layer identifier of an image layer of the to-be-deployed image according to the image tag of the to-be-deployed image.

Optionally, the management node obtains, from the image registry, layer identifiers of all image layers of the to-be-deployed image, so that subsequent deployment host selection is more accurate.

Optionally, the management node may locally store layer identifiers of image layers of some images. If the to-be-deployed image is one of these images, the management node does not need to request, from the image registry, the layer identifier of the image layer of the to-be-deployed image.

It should be noted that, in step 600, layer identifiers of some image layers that have been deployed on each host may be obtained, and correspondingly, in step 604, the management node may also obtain layer identifiers of some image layers of the to-be-deployed image from the image registry.

In step 604, layer identifiers that are of image layers of the to-be-deployed image and that are obtained from the image registry may have a dependency relationship. In an example, the image tag of the to-be-deployed image is Mysql:5.4. The obtained layer identifiers of the image layers of the image are, for example, the layer identifier 1—the layer identifier 2—the layer identifier 3—the layer identifier 4—the layer identifier 5—the layer identifier 10. The obtained layer identifiers of the image layers of the to-be-deployed image may not have a dependency relationship. The obtained layer identifiers of the image layers of the image are, for example, the layer identifier 1, the layer identifier 2, the layer identifier 5, the layer identifier 4, the layer identifier 3, and the layer identifier 10.

Step 606: The management node determines at least two to-be-selected hosts from the hosts in the container system.

Optionally, before step 606, the management node further obtains resource utilization information of each host in the container system. The step 606 includes: determining, according to the resource utilization information of each host in the container system, the at least two to-be-selected hosts that meet a resource utilization requirement of the to-be-deployed image. The to-be-selected hosts are selected, so that the management node only needs to select a deployment node from the to-be-selected hosts in a subsequent step, thereby improving working efficiency of the management node. Because the to-be-selected hosts need to meet the resource utilization requirement of the to-be-deployed image, the deployment node selected from the to-be-selected hosts can necessarily meet the resource utilization requirement of the to-be-deployed image, thereby improving a success rate for deployment of the to-be-deployed image.

When a user sends a request to the management node, to request the management node to deploy the to-be-deployed image, the user may also send an expected resource utilization requirement of the to-be-deployed image, such as CPU usage and memory usage. If the user does not send the resource utilization requirement of the to-be-deployed image, the management node may query for a historical resource utilization request of a deployed image and use the resource utilization requirement that is of the to-be-deployed image and that is stored in the resource utilization request. Then, the management node determines, with reference to the resource utilization information of each host and the resource utilization requirement of the to-be-deployed image, the at least two to-be-selected hosts that can meet the resource utilization requirement of the to-be-deployed image.

It should be noted that a sequence for performing step 604 and step 606 is not limited. Especially, if step 606 is first performed, and the management node can determine, from the hosts in the container system, only one to-be-selected host that can meet the resource utilization requirement of the to-be-deployed image, the management node does not need to perform step 604 and steps following step 606, and directly selects the to-be-selected host as the deployment host of the to-be-deployed image.

Step 608: The management node determines a layer identifier of an image layer that has been deployed on each to-be-selected host.

In step 600, the management node has obtained the layer identifiers of the image layers that have been deployed on the hosts in the container system. The management node obtains the layer identifier of the image layer that has been deployed on each to-be-selected host from the layer identifiers.

Step 610: Specify a deployment host for the to-be-deployed image according to the layer identifier of the image layer of the to-be-deployed image and the layer identifier of the image layer that has been deployed on each to-be-selected host, where the deployment host is configured to deploy the to-be-deployed image, and an image layer that is of the to-be-deployed image and that has been deployed on the deployment host meets a predetermined policy.

Step 610 may include: matching the layer identifier of the image layer of the to-be-deployed image with the layer identifier of the image layer that has been deployed on each to-be-selected host, to determine an image layer that is of the to-be-deployed image and that has been deployed on each to-be-selected host; and comparing the image layers of the to-be-deployed image that have been deployed on the to-be-selected hosts, and specifying the deployment host according to a comparison result and the predetermined policy, where the predetermined policy is that a to-be-selected host with a largest quantity of deployed image layers of the to-be-deployed image is selected as the deployment host from the at least two to-be-selected hosts.

It should be noted that, after the image layer that is of the to-be-deployed image and that has been deployed on each to-be-selected host is obtained, a size of an image layer that each to-be-selected host lacks relative to the to-be-deployed image may be further obtained, and the deployment host is selected with reference to a resource utilization status of each to-be-selected host. Therefore, in actual application, although the predetermined policy is designed, a finally selected deployment host may not be a to-be-selected host with a largest quantity of image layers of the to-be-deployed image.

In step 610, the manner of determining, by the management node, the image layers of the to-be-deployed image that have been deployed on the to-be-selected hosts varies with the representation manner of the layer identifiers, stored on the management node in step 600, of the image layers that have been deployed on the hosts, and whether the layer identifiers of the image layers of the to-be-deployed image, obtained from the image registry in step 604 have a dependency relationship. In an example, the image tag of the to-be-deployed image is Mysql:5.4. The layer identifiers that are of the image layers of the to-be-deployed image and that are obtained by the management node may be the layer identifier 1—the layer identifier 2—the layer identifier-the layer identifier 3—the layer identifier 4—the layer identifier 5—the layer identifier 10 that have a dependency relationship; or the layer identifier 1, the layer identifier 2, the layer identifier 5, the layer identifier 4, the layer identifier 3, and the layer identifier 10 that do not have a dependency relationship.

If in step 604, the layer identifiers that are of the image layers of the to-be-deployed image and that are obtained from the image registry do not have a dependency relationship, the layer identifiers of the image layers of the to-be-deployed image and the layer identifier of the image layer that is of the to-be-deployed image and that has been deployed on each to-be-selected host need to be matched one by one, so that the image layer that is of the to-be-deployed image and that has been deployed on each to-be-selected host is determined.

In step 604, the layer identifiers that are of the image layers of the to-be-deployed image and that are obtained from the image registry have a dependency relationship. In the manner 4, because layer identifiers that are of deployed image layers and that are reported by each to-be-selected host have a dependency relationship, if the layer identifiers that are of the image layers of the to-be-deployed image and that are obtained in step 604 also have a dependency relationship, a currently to-be-selected host is first determined from the selected to-be-selected hosts, and then, the layer identifier of the image layer of the to-be-deployed image is matched with a layer identifier of an image layer that has been deployed on the currently to-be-selected host. Matching may be performed in a matching sequence from a top-layer image layer to the bottom, and the following steps are included. Step 1: Match a layer identifier of a top-layer image layer of the to-be-deployed image with the layer identifier of the image layer that has been deployed on the currently to-be-selected host; and if matching is successful, determine that all the image layers of the to-be-deployed image have been deployed on the currently to-be-selected host, or perform step 2 if matching is unsuccessful. Step 2: Match a layer identifier of a current image layer with the layer identifier of the image layer that has been deployed on the currently to-be-selected host, where the current image layer is a parent image layer of the image layer that is of the to-be-deployed image and on which matching has been performed in the previous step; and if matching is successful, determine that all the image layers below the current image layer have been deployed on the currently to-be-selected host, where the image layers below the current image layer herein include a parent image of the current image layer, a parent image layer of the parent image layer of the current image layer, and the like, or if matching is unsuccessful, perform step 2 again until matching is performed on each image layer of the to-be-deployed image. In any step, if a layer identifier of an image layer is matched on the currently to-be-selected host, no further step is performed. After one to-be-selected host is specified as the currently to-be-selected host and performs the foregoing steps, another to-be-selected host is specified to perform the foregoing steps until all the to-be-selected hosts perform the foregoing steps. After that, the image layer that is of the to-be-deployed image and that has been deployed on each to-be-selected host is determined.

Figure 10:
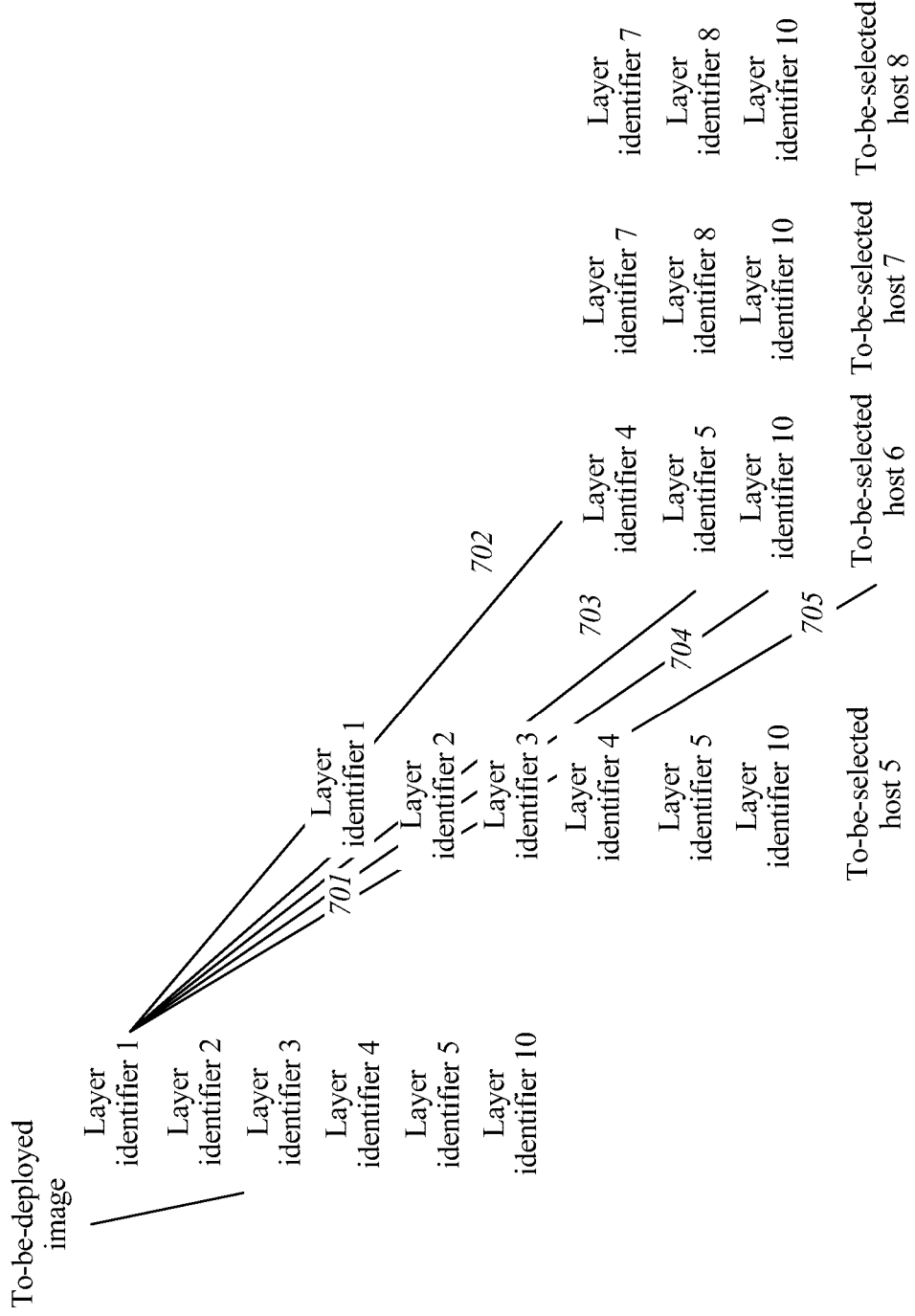
FIG. 10(*a*) to FIG. 10(*c*) are schematic diagrams of matching procedures of layer identifiers of image layers according to an embodiment of this application.
Figure 10:
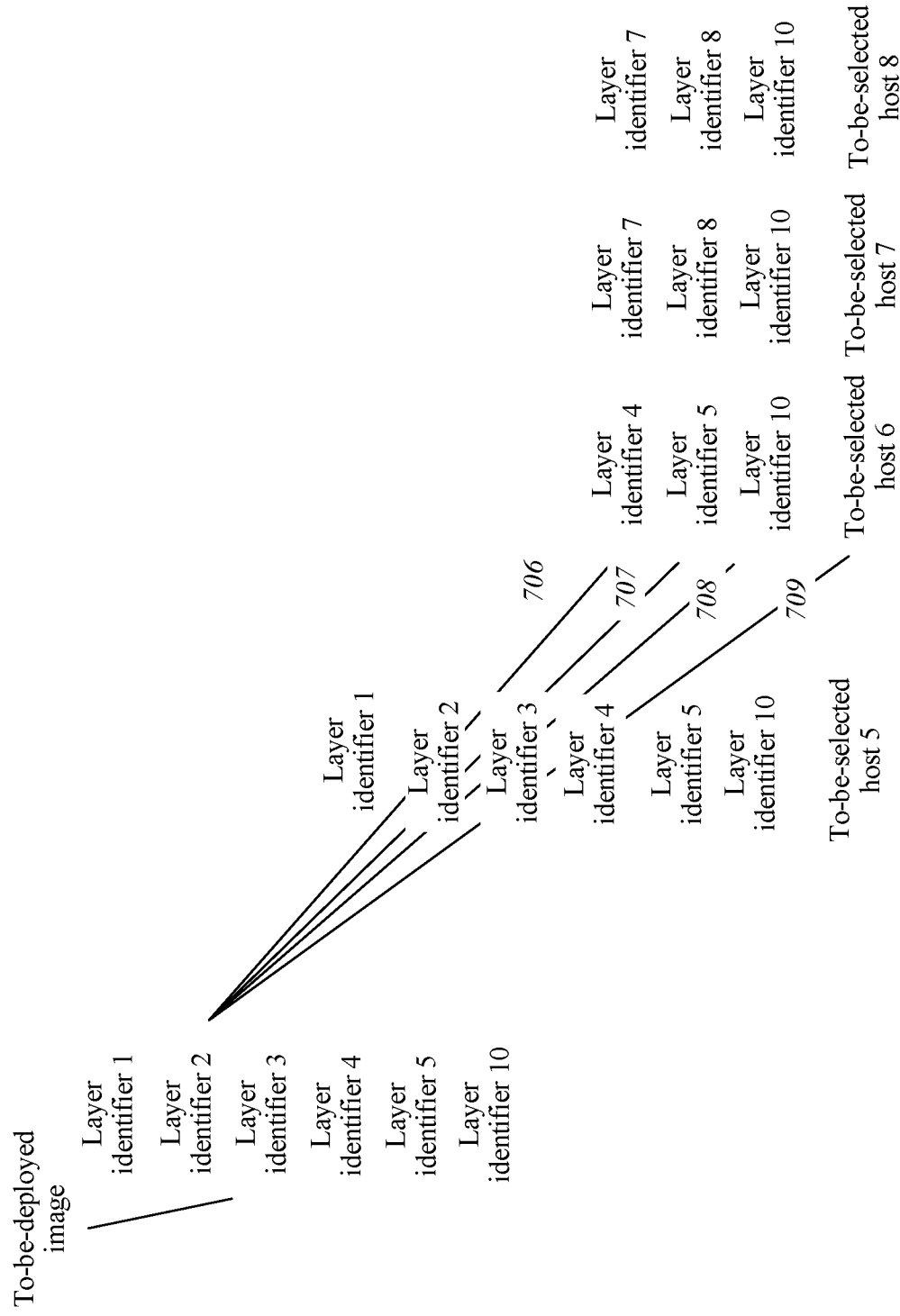
Figure 10:
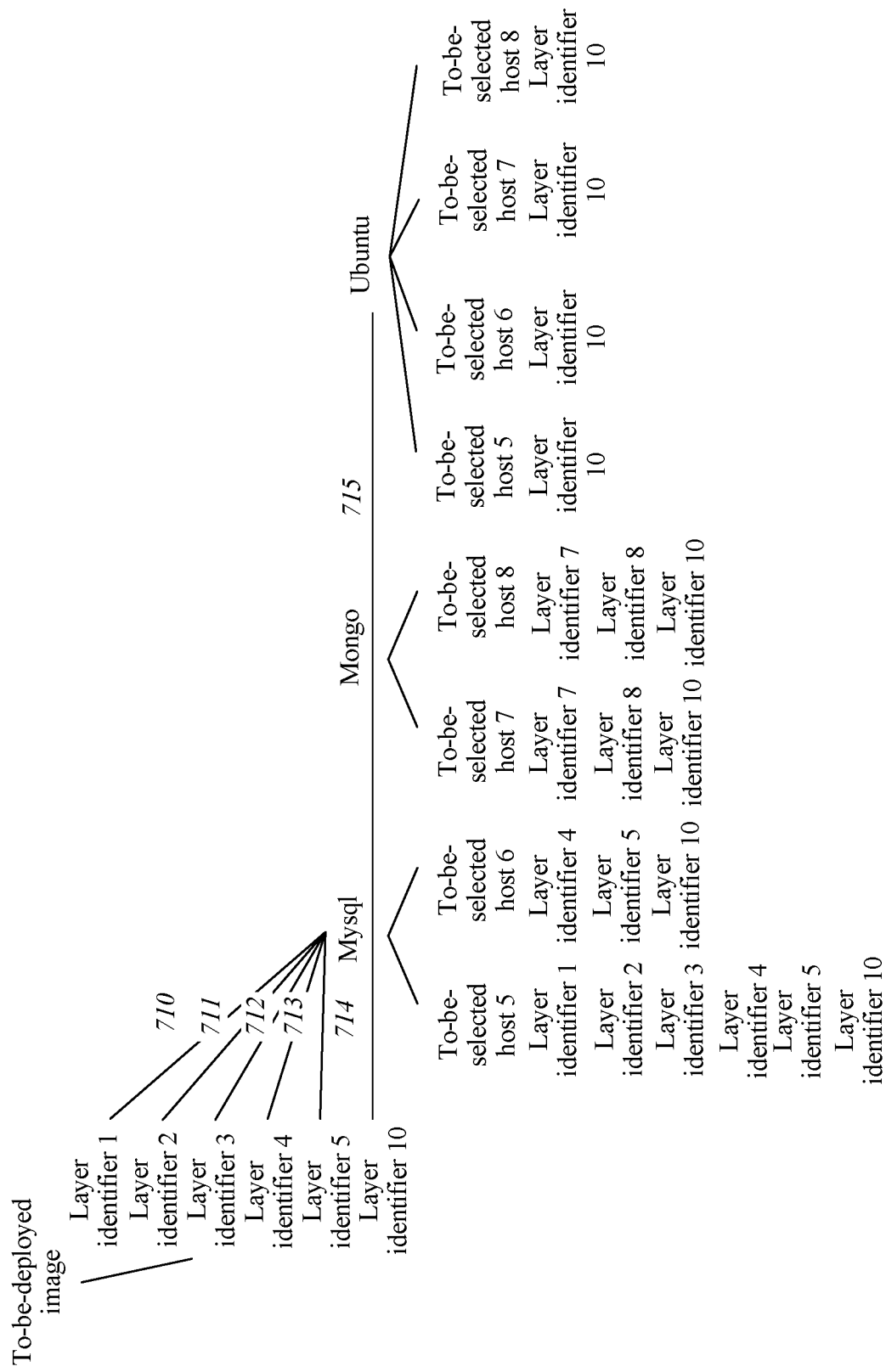

As shown in FIG. 10(a), the layer identifier 1 is matched with the layer identifier of the image layer that has been deployed on each to-be-selected host. If the layer identifier 1 is successfully matched on a to-be-selected host, no matching needs to be further performed on the to-be-selected host because layer identifiers of image layers that have been deployed on the to-be-selected host have a dependency relationship, for example, 701. If the layer identifier 1 is not matched on a to-be-selected host in a matching process, downward matching is performed on a layer identifier of an image layer that has been deployed on the to-be-selected host until matching is performed on all layer identifiers, for example, 702, 703, 704, and 705. Matching processes of the to-be-selected host 7 and the to-be-selected host 8 are omitted in the figure. The to-be-deployed image has been deployed on a to-be-selected host on which the layer identifier of the top-layer image layer of the to-be-deployed image is matched. That is, all image layers of Mysql:5.4 have been deployed on the to-be-selected host 5.

Then, a layer identifier of a second-top-layer image layer of the to-be-deployed image is matched with a layer identifier of an image layer that has been deployed on a to-be-selected host in the at least two to-be-selected hosts, and the to-be-selected host is a host on which matching is unsuccessful in the previous step. All image layers except the top-layer image layer of the to-be-deployed image have been deployed on a to-be-selected host on which the layer identifier of the second-top-layer image layer of the to-be-deployed image is successfully matched. As shown in FIG. 10(b), the layer identifier 2 is matched on each to-be-selected host, and no matching needs to be further performed on a to-be-selected host on which matching is successful in the previous step. A specific matching process is shown in 706 to 709. Matching processes of the to-be-selected host 7 and the to-be-selected host 8 are omitted in the figure. This step is repeatedly performed. After a layer tag of an image layer of the to-be-deployed image and each to-be-selected host are matched, a parent image layer of the image layer and a remaining to-be-selected host are matched until matching is performed on the layer identifier of the image layer that has been deployed on each to-be-selected host.

In the foregoing method for obtaining a parent image that is of the to-be-deployed image and that has been deployed on each to-be-selected host, the to-be-deployed image does not need to be compared with all parent images of the to-be-deployed image that have been deployed on each to-be-selected host, thereby improving matching efficiency.

In the manner 5, a to-be-selected host reports, to the management node, layer identifiers that are of image layers included in each image repository and that do not have a dependency relationship. Therefore, to determine the image layer that is of the to-be-deployed image and that has been deployed on the to-be-selected host, the layer identifier of the image layer of the to-be-deployed image needs to be compared with stored layer identifiers of image layers that have been deployed on the at least two to-be-selected hosts, so that the image layer that is of the to-be-deployed image and that has been deployed on each to-be-selected host can be obtained.

The manner 6 differs from the manner 5 in that, first, an application in the image tag of the to-be-deployed image is used as an index, to query the layer identifier, which is stored on the management node, of the image layer that has been deployed on each host. As shown in FIG. 10(c), first, because the layer identifier 1 to the layer identifier 5 all belong to image layers of Mysql, matching is performed only on the to-be-selected host 5 and the to-be-selected host 6. Therefore, it may be learned from 710 to 714 that an image layer corresponding to the layer identifier 1 and image layers below the image layer are deployed only on the to-be-selected host 5, and an image layer corresponding to the layer identifier 4 and image layers below the image layer are deployed on the to-be-selected host 6. An image layer corresponding to the layer identifier 10 belongs to Ubuntu. Therefore, it may be learned from 715 that the image layer corresponding to the layer identifier 10 is deployed on the to-be-selected host 5 to the to-be-selected host 8. According to such an image tag storage structure, the management node can more quickly obtain the image layer that is of the to-be-deployed image and that has been deployed on each to-be-selected host. In the foregoing method for obtaining an image layer that is of the to-be-deployed image and that has been deployed on each to-be-selected host, the layer identifier of the image layer of the to-be-deployed image does not need to be compared with all layer identifiers of the image layers of the to-be-deployed image that have been deployed on each to-be-selected host, thereby improving matching efficiency.

Step 600 to step 610 may be performed by a container system management module of the management node. After determining the deployment host in step 610, the container system management module sends an identifier of the deployment host to a container system scheduling module. The container system scheduling module instructs, according to the identifier of the deployment host, the deployment host to deploy the to-be-deployed image.

In the image deployment method corresponding to FIG. 8, a degree of overlapping between an image layer that has been deployed on each host and an image layer included in a to-be-deployed image is determined, and a host that needs to download fewer image layers in a deployment process is selected to deploy the to-be-deployed image. This effectively improves a deployment speed of the to-be-deployed image.

The image deployment method corresponding to FIG. 8 and the image deployment method corresponding to FIG. 5 each have their own features. In the image deployment method corresponding to FIG. 8, an image layer of a to-be-deployed image layer and a deployed image layer are compared to determine a deployment host. This is more accurate. In the image deployment method corresponding to FIG. 5, a parent image of a to-be-deployed image and a deployed image are compared to determine a deployment host. This is quicker than comparison performed on image layers. In actual application, the two image deployment methods may be used in combination.

An embodiment of the present disclosure further provides an image deployment apparatus 800. The apparatus may be implemented by using the computing device 200 shown in FIG. 4, or may be implemented by using an application-specific integrated circuit (ASIC), or may be implemented by using a programmable logic device (PLD). The PLD may be a complex programmable logic device (CPLD), an FPGA, a generic array logic (GAL), or any combination thereof. The image deployment apparatus 800 is configured to implement the image deployment method shown in FIG. 5. When the image deployment method shown in FIG. 5 is implemented by using software, the image deployment apparatus 800 may be a software module.

Figure 11:
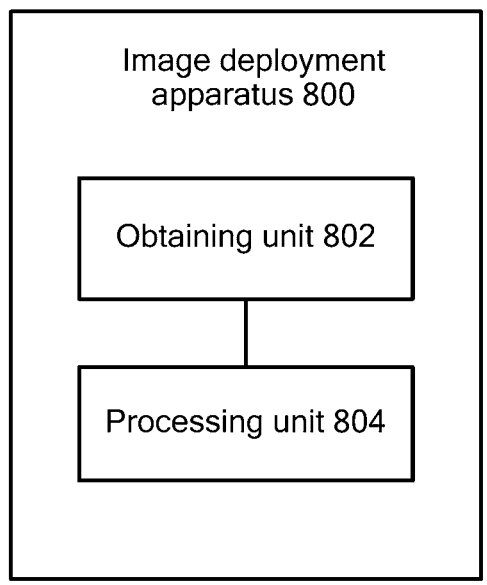
FIG. 11 is a schematic diagram of an organization structure of an image deployment apparatus according to an embodiment of this application.

A schematic diagram of an organization structure of the image deployment apparatus 800 is shown in FIG. 11, and the image deployment apparatus 800 includes an obtaining unit 802 and a processing unit 804. During working, the obtaining unit 802 performs step 400, step 402, and a part of step 406 in the image deployment method shown in FIG. 5. The part of step 406 includes: obtaining resource utilization information of each host in a container system. During working, the processing unit 804 performs step 404 to step 410 in the image deployment method shown in FIG. 5, and optional solutions of step 404 to step 410.

The image deployment apparatus can determine a degree of overlapping between an image that has been deployed on each host and a parent image included in a to-be-deployed image, and select a host that needs to download fewer images in a deployment process, to deploy the to-be-deployed image. This effectively improves a deployment speed of the to-be-deployed image.

An embodiment of the present disclosure further provides an image deployment apparatus 1000. The apparatus may be implemented by using the computing device 200 shown in FIG. 4, or may be implemented by using an ASIC or a PLD. The PLD may be a complex programmable CPLD, an FPGA, a GAL, or any combination thereof. The image deployment apparatus 1000 is configured to implement the image deployment method shown in FIG. 8. When the image deployment method shown in FIG. 8 is implemented by using software, the image deployment apparatus 1000 may be a software module.

Figure 12:
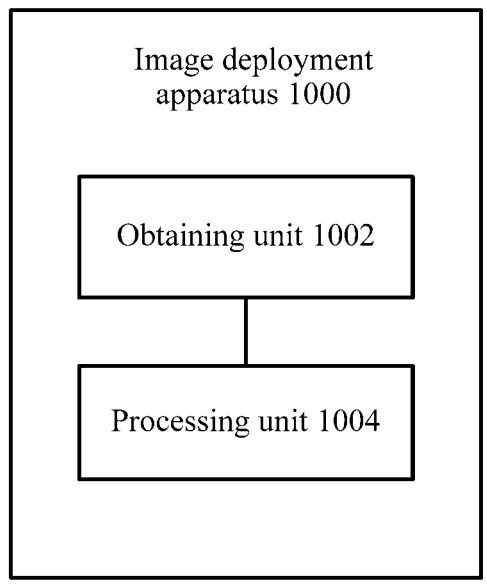
FIG. 12 is a schematic diagram of an organization structure of another image deployment apparatus according to an embodiment of this application.

A schematic diagram of an organization structure of the image deployment apparatus 1000 is shown in FIG. 12, and the image deployment apparatus 1000 includes an obtaining unit 1002 and a processing unit 1004. During working, the obtaining unit 1002 performs step 600, step 602, and a part of step 606 in the image deployment method shown in FIG. 8. The part of step 606 includes: obtaining resource utilization information of each host in a container system. During working, the processing unit 1004 performs step 604 to step 610 in the image deployment method shown in FIG. 8, and optional solutions of step 604 to step 610.

The image deployment apparatus can determine a degree of overlapping between an image layer that has been deployed on each host and an image layer included in a to-be-deployed image, and select a host that needs to download fewer image layers in a deployment process, to deploy the to-be-deployed image. This effectively improves a deployment speed of the to-be-deployed image.

An embodiment of the present disclosure further provides a first image deployment method applied to the container system shown in FIG. 1 or FIG. 2, and the method includes:

when a trigger occasion is met, sending, by a host in the container system, an image tag of a locally deployed image to a management node.

Optionally, that the trigger occasion is met includes: a preset period expires, or a collection instruction sent by the management node is received, or it is detected that the locally deployed image changes. The collection instruction is used to instruct to send the image tag of the deployed image to the management node.

As shown in FIG. 1, a host image management module is deployed on the host in the container system, and a host image management module on each host learns, by means of monitoring, whether a change occurs on an image deployed on the host, that is, the locally deployed image, for example, whether there is a newly downloaded image, whether a user deletes an image, or the like. If a change occurs, the host image management module sends, to the management node, an image tag of the image that has been deployed on the host, to update information on the management node. Alternatively, when the preset period expires, the host may report an image tag of an image that has been deployed on the host. Alternatively, the host may perform reporting after receiving the collection instruction sent by the management node.

For actions executed after the management node receives and stores the image tag of the image that has been deployed on the host in the container system, refer to the image deployment method corresponding to FIG. 5.

In the image deployment method, a degree of overlapping between an image that has been deployed on each host in a container system and a parent image included in a to-be-deployed image is determined, and a host that needs to download fewer images in a deployment process is selected to deploy the to-be-deployed image. This effectively improves a deployment speed of the to-be-deployed image in the container system.

An embodiment of the present disclosure further provides a second image deployment method applied to the container system shown in FIG. 1 or FIG. 2, and the method includes:

when a trigger occasion is met, sending, by a host in the container system, a layer identifier of a locally deployed image layer to a management node.

Optionally, that the trigger occasion is met includes: a preset period expires, or a collection instruction sent by the management node is received, or it is detected that the locally deployed image changes. The collection instruction is used to instruct to send an image tag of the deployed image to the management node.

As shown in FIG. 1, a host image management module is deployed on the host in the container system, and a host image management module on each host learns, by means of monitoring, whether a change occurs on an image layer deployed on the host, that is, the locally deployed image, for example, whether there is a newly downloaded image layer, whether a user deletes an image layer, or the like. If a change occurs, the host image management module sends, to the management node, a layer identifier of the image layer that has been deployed on the host, to update information on the management node. Alternatively, when the preset period expires, the host may report a layer identifier of an image layer that has been deployed on the host. Alternatively, the host may perform reporting after receiving the collection instruction sent by the management node.

For actions executed after the management node receives and stores the layer identifier of the image layer that has been deployed on the host in the container system, refer to the image deployment method corresponding to FIG. 8.

In the image deployment method, a degree of overlapping between an image layer that has been deployed on each host in a container system and an image layer included in a to-be-deployed image is determined, and a host that needs to download fewer image layers in a deployment process is selected to deploy the to-be-deployed image. This effectively improves a deployment speed of the to-be-deployed image in the container system.

An embodiment of the present disclosure further provides a first container system. A schematic diagram of an organization structure of the container system is shown in FIG. 1 or FIG. 2. When running, the container system executes the foregoing first image deployment method applied to the container system.

An embodiment of the present disclosure further provides a second container system. A schematic diagram of an organization structure of the container system is shown in FIG. 1 or FIG. 2. When running, the container system executes the foregoing second image deployment method applied to the container system.

In the foregoing embodiments, the description of each embodiment has respective focuses. For content not described in detail in an embodiment, refer to related descriptions in other embodiments. Implementation details of the image deployment method shown in FIG. 5 may be used by the image deployment apparatus 800 and applied to the first image deployment method of the container system. For actions executed by the management node, refer to the image deployment method shown in FIG. 5. Implementation details of the image deployment method shown in FIG. 8 may be used by the image deployment apparatus 1000 and applied to the second image deployment method of the container system. For actions executed by the management node, refer to the image deployment method shown in FIG. 8.

The management node in the first container system may be implemented by using the computing device 200 or the image deployment apparatus 800. The management node in the second container system may be implemented by using the computing device or the image deployment apparatus 1000 for executing the image deployment method shown in FIG. 8.

The method described in combination with the disclosed content in this application may be implemented in a manner of executing a software instruction by a processor. The software instruction may include a corresponding software module. The software module may be stored in a RAM, a flash memory, a ROM, an erasable programmable read only memory (EPROM), an electrically erasable programmable read only memory (EEPROM), a hard disk drive, an optical disc, or a storage medium in any other forms well-known in the art.

A person skilled in the art should be aware that in the foregoing one or more examples, functions described in this application may be implemented by hardware or software. When the present disclosure is implemented by using software, the foregoing functions may be stored in a computer-readable medium or transmitted as one or more instructions or code in the computer-readable medium. The storage medium may be any available medium accessible to a general-purpose or dedicated computer.

The objectives, technical solutions, and benefits of this application are further described in detail in the foregoing specific embodiments. It should be understood that the foregoing descriptions are merely specific embodiments of this application, but are not intended to limit the protection scope of this application. Any modification or improvement made within the principle of this application shall fall within the protection scope of this application.

What is claimed is:

1. An image deployment method, comprising:
    obtaining an image tag of a to-be-deployed image, wherein an image registry stores multiple images, each image of the multiple images represented by an image tag, wherein the multiple images comprise at least one image repository, each image repository comprising n images, and wherein there is a parent-child relationship between at least two images of the n images;
    obtaining, from the image registry, an image tag of a parent image of the to-be-deployed image according to the image tag of the to-be-deployed image;
    determining at least two to-be-selected hosts from hosts in a container system;
    determining, for each of the at least two to-be-selected hosts, an image tag of an image that has been deployed on the to-be-selected host;
    matching the image tag of the parent image of the to-be-deployed image with the image tag of the image that has been deployed on each to-be-selected host, to determine a parent image that is of the to-be-deployed image and that has been deployed on each to-be-selected host;

comparing the parent images of the to-be-deployed image that have been deployed on the to-be-selected hosts; and selecting a deployment host for the to-be-deployed image according to a comparison result and a predetermined policy, wherein the predetermined policy is that a to-be-selected host with a largest quantity of deployed parent images of the to-be-deployed image is selected as the deployment host from the at least two to-be-selected hosts;

wherein the matching the image tag of the parent image of the to-be-deployed image with the image tag of the image that has been deployed on each to-be-selected host, to determine the parent image that is of the to-be-deployed image and that has been deployed on each to-be-selected host comprises:

determining a currently to-be-selected host from the at least two to-be-selected hosts, and sequentially performing the following steps until a parent image that is of the to-be-deployed image and that has been deployed on the currently to-be-selected host is determined, wherein the steps comprise:

step 1: matching the image tag of the to-be-deployed image with an image tag of an image that has been deployed on the currently to-be-selected host; and if the matching in the step 1 is successful, determine that the to-be-deployed image has been deployed on the currently to-be-selected host, or perform step 2 if the matching in the step 1 is unsuccessful;

step 2: matching an image tag of a top-layer parent image of the to-be-deployed image with the image tag of the image that has been deployed on the currently to-be-selected host; and if the matching in the step 2 is successful, determine that all parent images of the to-be-deployed image have been deployed on the currently to-be-selected host, or perform step 3 if the matching in the step 2 is unsuccessful; and step 3: matching an image tag of a current image with the image tag of the image that has been deployed on the currently to-be-selected host, wherein the current image is a top-layer parent image of the parent image that is of the to-be-deployed image and on which matching has been performed in the previous step; and if the matching in the step 3 is successful, determine that all the parent images of the current image have been deployed on the currently to-be-selected host, or if the matching in the step 3 is unsuccessful, perform step 3 again until each parent image of the to-be-deployed image has been matched with the image tag of the image that has been deployed on the currently to-be-selected host.

2. The image deployment method according to claim 1, further comprising:

when a trigger occasion is met, obtaining and storing, for each host in the container system, an image tag of an image that has been deployed on the host, wherein the trigger occasion is met in response to determining that: a preset period expires, or a container deployment instruction is received, or a collection instruction sent is received, wherein the collection instruction is used to instruct to collect and store the image tag of the images that have been deployed on the hosts; and determining, for each to-be-selected host and according to the stored image tag of the images that have been deployed on the hosts, the image tag of the image that has been deployed on the to-be-selected host.

3. The image deployment method according to claim 1, wherein before the determining the at least two to-be-selected hosts from the hosts in the container system, the method further comprises: obtaining resource utilization information of each host, wherein the resource utilization information comprises memory usage or central processing unit usage; and wherein the determining the at least two to-be-selected hosts from the hosts in the container system comprises:

determining, according to the resource utilization information of each host, the at least two to-be-selected hosts that meet a resource utilization requirement of the to-be-deployed image.

4. A computing device set in a container system, comprising:

a memory storing a program; and a processor configured to execute the program to cause the computer device to:

obtain an image tag of a to-be-deployed image, wherein an image registry stores multiple images, each image of the multiple images represented by an image tag, wherein the multiple images comprise at least one image repository, each image repository comprising n images, and wherein there is a parent-child relationship between at least two images of the n images;

obtain, from the image registry, an image tag of a parent image of the to-be-deployed image according to the image tag of the to-be-deployed image;

determine at least two to-be-selected hosts from hosts in the container system;

determine, for each of the at least two to-be-selected hosts, an image tag of an image that has been deployed on the to-be-selected host;

match the image tag of the parent image of the to-be-deployed image with the image tag of the image that has been deployed on each to-be-selected host, to determine a parent image that is of the to-be-deployed image and that has been deployed on each to-be-selected host;

compare the parent images of the to-be-deployed image that have been deployed on the to-be-selected hosts; and select a deployment host for the to-be-deployed image according to a comparison result and a predetermined policy, wherein the predetermined policy is that a to-be-selected host with a largest quantity of deployed parent images of the to-be-deployed image is selected as the deployment host from the at least two to-be-selected hosts;

wherein the matching step comprises:

determining a currently to-be-selected host from the at least two to-be-selected hosts, and sequentially performing the following steps until a parent image that is of the to-be-deployed image and that has been deployed on the currently to-be-selected host is determined, wherein the steps comprise:

step 1: matching the image tag of the to-be-deployed image with an image tag of an image that has been deployed on the currently to-be-selected host and if the matching in the step 1 is successful, determine that the to-be-deployed image has been deployed on the currently to-be-selected host, or perform step 2 if the matching in the step 1 is unsuccessful;

step 2: matching an image tag of a top-layer parent image of the to-be-deployed image with the image tag of the image that has been deployed on the currently to-be-selected host and if the matching in the step 2 is successful, determine that all parent images of the to-be-deployed image have been deployed on the currently to-be-selected host, or perform step 3 if the matching in the step 2 is unsuccessful; and step 3: matching an image tag of a current image with the image tag of the image that has been deployed on the currently to-be-selected host, wherein the current image is a top-layer parent image of the parent image that is of the to-be-deployed image and on which matching has been performed in the previous step; and if the matching in the step 3 is successful, determine that all the parent images of the current image have been deployed on the currently to-be-selected host, or if the matching in the step 3 is unsuccessful, perform step 3 again until each parent image of the to-be-deployed image has been matched with the image tag of the image that has been deployed on the currently to-be-selected host.

5. The computing device according to claim 4, wherein the processor is further configured to execute the program to cause the computing device to:

when a trigger occasion is met, obtain, for each host in the container system, an image tag of an image that has been deployed on the host; wherein the trigger occasion is met in response to determining that: a preset period expires, or a container deployment instruction is received, or a collection instruction sent is received, wherein the collection instruction is used to instruct to collect and store the image tag of the images that have been deployed on the hosts;

store, for each host in the container system, the image tag of the image that has been deployed on the host into the memory; and determine, for each to-be-selected host and according to the stored image tag of the images that have been deployed on the hosts, the image tag of the image that has been deployed on the to-be-selected host.

6. The computing device according to claim 4, wherein the processor is further configured to execute the program to cause the computing device to:

obtain resource utilization information of each host, wherein the resource utilization information comprises memory usage or central processing unit usage; and determine according to the resource utilization information of each host, the at least two to-be-selected hosts that meet a resource utilization requirement of the to-be-deployed image.

7. A non-transitory computer-readable storage medium having stored thereon program code, wherein a computing device executes the program code to perform a method of:

obtaining an image tag of a to-be-deployed image, wherein an image registry stores multiple images, each image of the multiple images represented by an image tag, wherein the multiple images comprise at least one image repository, each image repository comprising n images, and wherein there is a parent-child relationship between at least two images of the n images;

obtaining, from the image registry, an image tag of a parent image of the to-be-deployed image according to the image tag of the to-be-deployed image;

determining at least two to-be-selected hosts from hosts in a container system;

determining, for each of the at least two to-be-selected hosts, an image tag of an image that has been deployed on the to-be-selected host;

matching the image tag of the parent image of the to-be-deployed image with the image tag of the image that has been deployed on each to-be-selected host, to determine a parent image that is of the to-be-deployed image and that has been deployed on each to-be-selected host;

comparing the parent images of the to-be-deployed image that have been deployed on the to-be-selected hosts; and selecting a deployment host for the to-be-deployed image according to a comparison result and a predetermined policy, wherein the predetermined policy is that a to-be-selected host with a largest quantity of deployed parent images of the to-be-deployed image is selected as the deployment host from the at least two to-be-selected hosts;

wherein the matching the image tag of the parent image of the to-be-deployed image with the image tag of the image that has been deployed on each to-be-selected host, to determine the parent image that is of the to-be-deployed image and that has been deployed on each to-be-selected host comprises:

determining a currently to-be-selected host from the at least two to-be-selected hosts, and sequentially performing the following steps until a parent image that is of the to-be-deployed image and that has been deployed on the currently to-be-selected host is determined, wherein the steps comprise:

step 1: matching the image tag of the to-be-deployed image with an image tag of an image that has been deployed on the currently to-be-selected host; and if the matching in the step 1 is successful, determine that the to-be-deployed image has been deployed on the currently to-be-selected host, or perform step 2 if the matching in the step 1 is unsuccessful;

step 2: matching an image tag of a top-layer parent image of the to-be-deployed image with the image tag of the image that has been deployed on the currently to-be-selected host; and if the matching in the step 2 is successful, determine that all parent images of the to-be-deployed image have been deployed on the currently to-be-selected host, or perform step 3 if the matching in the step 2 is unsuccessful; and step 3: matching an image tag of a current image with the image tag of the image that has been deployed on the currently to-be-selected host, wherein the current image is a top-layer parent image of the parent image that is of the to-be-deployed image and on which matching has been performed in the previous step; and if the matching in the step 3 is successful, determine that all the parent images of the current image have been deployed on the currently to-be-selected host, or if the matching in the step 3 is unsuccessful, perform step 3 again until each parent image of the to-be-deployed image has been matched with the image tag of the image that has been deployed on the currently to-be-selected host.

* * * * *